(12) United States Patent
Schmeder

(10) Patent No.: US 11,940,675 B2
(45) Date of Patent: Mar. 26, 2024

(54) SPECTRAL GLARE CONTROL EYEWEAR FOR COLOR BLINDNESS AND LOW VISION ASSISTANCE

(71) Applicant: ENCHROMA, INC., Berkeley, CA (US)

(72) Inventor: Andrew Schmeder, Richmond, CA (US)

(73) Assignee: EnChroma, Inc., Berkeley, CA (US)

(*) Notice: Subject to any disclaimer, the term of this patent is extended or adjusted under 35 U.S.C. 154(b) by 231 days.

(21) Appl. No.: 17/464,171

(22) Filed: Sep. 1, 2021

(65) Prior Publication Data
US 2022/0075211 A1   Mar. 10, 2022

Related U.S. Application Data

(60) Provisional application No. 63/074,929, filed on Sep. 4, 2020.

(51) Int. Cl.
G02C 7/10    (2006.01)
G02C 7/02    (2006.01)

(52) U.S. Cl.
CPC ............. *G02C 7/104* (2013.01); *G02C 7/022* (2013.01)

(58) Field of Classification Search
CPC ............. G02C 7/104; G02C 7/22; G02B 5/23
USPC ................... 351/41, 159.01, 159.6
See application file for complete search history.

(56) References Cited

U.S. PATENT DOCUMENTS

| | | |
|---|---|---|
| 3,877,797 A | 4/1975 | Thornton, Jr. |
| 4,176,299 A | 11/1979 | Thornton, Jr. |
| 4,300,819 A | 11/1981 | Taylor |
| 4,826,286 A | 5/1989 | Thornton, Jr. |

(Continued)

FOREIGN PATENT DOCUMENTS

| | | |
|---|---|---|
| CN | 1165967 A | 11/1997 |
| CN | 101441289 A | 5/2009 |

(Continued)

OTHER PUBLICATIONS

ANSI Z80.3-2010; The Accredited Committee Z80 for Ophthalmic Standards; American National Standard for Ophthalmics—Nonprescription Sunglass and Fashion Eyewear Requirements; Jun. 7, 2010; pp. 1-24.

(Continued)

*Primary Examiner* — Tuyen Tra
(74) *Attorney, Agent, or Firm* — Schmidt Patent Law, Inc.

(57) ABSTRACT

The invention generally relates to optical filters that selectively attenuate the transmission of visible light for the purpose of enhancing or transforming the quality of human vision; to improved designs of such optical filters that provide an improved quality of color vision or of color perception; to methods of using such improved optical filters to enhance human vision during outdoor night time viewing conditions; to methods of using such improved optical filters to reduce the stimulation of the intrinsically photosensitive retinal ganglion cells (ipRGCs); to methods of using such improved optical filters to reduce the discomfort of glare; and to methods of using such improved optical filters to mitigate the symptoms of low vision or age-related visual impairments including for methods of treating or slowing the progression of persons with cone dystrophy including for persons with retinitis pigmentosa.

20 Claims, 18 Drawing Sheets

(56) References Cited

U.S. PATENT DOCUMENTS

| | | |
|---|---|---|
| 5,218,386 A | 6/1993 | Levien |
| 5,235,358 A | 8/1993 | Mutzhas et al. |
| 5,270,854 A | 12/1993 | Lee et al. |
| 5,369,453 A | 11/1994 | Chen et al. |
| 5,381,193 A | 1/1995 | Wedding |
| 5,408,278 A | 4/1995 | Christman |
| 5,574,517 A | 11/1996 | Pang et al. |
| 5,625,427 A | 4/1997 | Araujo et al. |
| 5,646,781 A | 7/1997 | Johnson, Jr. |
| 5,774,202 A | 6/1998 | Abraham et al. |
| 6,132,044 A | 10/2000 | Sternbergh |
| 6,145,984 A | 11/2000 | Farwig |
| 6,149,270 A | 11/2000 | Hayashi |
| 6,450,652 B1 | 9/2002 | Karpen |
| 7,106,502 B1 | 9/2006 | Sharp |
| 7,284,856 B2 | 10/2007 | Duha et al. |
| 7,393,100 B2 | 7/2008 | Mertz |
| 7,506,977 B1 | 3/2009 | Aiiso |
| 7,583,863 B2 | 9/2009 | Fouquet et al. |
| 7,597,441 B1 | 10/2009 | Farwig |
| 8,210,678 B1 | 7/2012 | Farwig |
| 9,606,277 B2 | 3/2017 | Blair et al. |
| 9,759,848 B2 | 9/2017 | Blair et al. |
| 9,764,157 B2 | 9/2017 | Blair et al. |
| 10,175,508 B2* | 1/2019 | Ambler ............... G02B 1/041 |
| 10,338,286 B2 | 7/2019 | Schmeder et al. |
| 10,359,552 B2 | 7/2019 | Blair et al. |
| 10,606,100 B2 | 3/2020 | Schmeder et al. |
| 10,606,101 B2 | 3/2020 | Schmeder et al. |
| 10,852,461 B2 | 12/2020 | Schmeder et al. |
| 10,852,567 B2 | 12/2020 | Valentine |
| 10,935,814 B2 | 3/2021 | Valentine |
| 2002/0126256 A1 | 9/2002 | Larson |
| 2004/0114242 A1 | 6/2004 | Sharp |
| 2005/0224703 A1 | 10/2005 | Harada et al. |
| 2005/0249377 A1 | 11/2005 | Fouquet et al. |
| 2006/0146275 A1 | 7/2006 | Mertz |
| 2008/0212319 A1 | 9/2008 | Klipstein |
| 2009/0128895 A1 | 5/2009 | Seo et al. |
| 2010/0179790 A1 | 7/2010 | Nakauchi et al. |
| 2010/0182678 A1 | 7/2010 | Southwell |
| 2011/0068698 A1 | 3/2011 | Swoboda et al. |
| 2011/0255051 A1 | 10/2011 | McCabe et al. |
| 2012/0206050 A1 | 8/2012 | Spero |
| 2012/0287117 A1 | 11/2012 | Weber et al. |
| 2013/0114036 A1 | 5/2013 | Pritts |
| 2013/0141693 A1 | 6/2013 | McCabe et al. |
| 2013/0252000 A1 | 9/2013 | Takiff et al. |
| 2014/0233105 A1 | 8/2014 | Schmeder et al. |
| 2014/0268031 A1 | 9/2014 | Ambler |
| 2016/0077361 A1 | 3/2016 | Wold et al. |
| 2017/0235160 A1* | 8/2017 | Larson ............... G02C 7/104 351/45 |
| 2017/0261768 A1 | 9/2017 | Ambler et al. |
| 2017/0299895 A1 | 10/2017 | Larson |
| 2017/0315384 A1 | 11/2017 | Saylor et al. |
| 2018/0164608 A1 | 6/2018 | Schmeder et al. |
| 2018/0224575 A1* | 8/2018 | Marck ............... G02B 5/28 |

FOREIGN PATENT DOCUMENTS

| | | |
|---|---|---|
| CN | 101690248 A | 3/2010 |
| CN | 102947680 A | 12/2013 |
| CN | 103688145 A | 3/2014 |
| CN | 104024891 A | 9/2014 |
| EP | 0519660 A1 | 12/1992 |
| EP | 0939329 A1 | 9/1999 |
| EP | 1986024 A1 | 10/2008 |
| EP | 1340115 B1 | 5/2009 |
| IN | 101203777 A | 6/2008 |
| JP | 2005-511457 A | 4/2005 |
| JP | 2006-145683 A | 6/2006 |
| JP | 2008-134618 A | 6/2008 |
| JP | 2008-282757 A | 11/2008 |
| JP | 2014-513315 A | 5/2014 |
| TW | 200619795 A | 6/2006 |
| TW | 201304513 A | 1/2013 |
| TW | 201461546 A | 8/2014 |
| WO | 95/05621 A1 | 2/1995 |
| WO | 02/42829 A1 | 5/2002 |
| WO | 02/094595 A2 | 11/2002 |
| WO | 2006/071734 A2 | 7/2006 |
| WO | 2007/094338 A1 | 8/2007 |
| WO | 2012/119158 A1 | 9/2012 |
| WO | 2013/022744 A2 | 2/2013 |
| WO | 2014/110101 A1 | 7/2014 |
| WO | 2015/179538 A1 | 11/2015 |
| WO | 2016/148984 A1 | 9/2016 |

OTHER PUBLICATIONS

British Standard BS EN 1836: 2005; Technical Committee CEN/TC 85 "Eye-protective equipment" Personal eye equipment—Sunglasses and sunglare filters for general use and filters for direct observation of the sun; Sep. 2007; pp. 1-43.

Rea, M.S. et al., Color Rendering: Beyond Pride and Prejudice; Color Research and Application, Dec. 2010; pp. 401-409; vol. 35; No. 6, 2010 Wiley Periodical, Inc.

Drum, Bruce, FDA regulation of labeling and promotional claims in therapeutic color vision devices; A tutorial; visual Neuroscience (2004), 21; pp. 461-463.

Tilsch, Markus K., et al., Manufacturing of precision optical coatings; Chinese Optics Letters vol. 8, Supplement; Apr. 30, 2010; pp. 38-43.

Moreland, Jack D., et al., Quantative assessment of commercial filter 'aids' for red-green colour defectives; Ophthal. Physiol. Opt. 2010 30; No. 5; pp. 685-692.

Vorobyev, Misha, et al., Receptor noise as a determinant of colour thresholds; Proc. R. Soc. Lond. B (1998) 265; pp. 351-358.

Sharp, G.D., et al., Retarder Stack Technology for Color Manipulation; 1999 SID International Symposium Digest of Technical Papers; May 1999; pp. 1072-1075.

Kirkpatrick, S. et al., Optimization by Simulated Annealing; Science, vol. 22, No. 4598; May 13, 1983 (May 13, 1983); pp. 671-680.

Linear Programming; Feb. 28, 2011 (Feb. 28, 2011); XP055027872; Retrieved from the Internet on May 23, 2012; URL: http://en.wikipedia.org/w/index.php?title-Linear_programming&oldid=416428507.

Swillam, Mohamed A., et al., Multilayer Optical Coatings Using Convex Optimization; Journal of Lightwave Technology, IEEE Service Center, New York, NY, US; vol. 25, No. 4, Apr. 1, 2007; pp. 1078-1085.

Exciton: "ABS 594: Visible Narrow Ban Absorber", Aug. 25, 2006, XP055510455, URL: http://www.exciton.com/pdfs/ABS594.pdf, 1 page.

Exciton: ABS574: "Visible Narrow Band Absorber", Aug. 25, 2006, XP055510453, URL http://www.exciton.com/pdfs/ABS574-031.

From the USPTO as the ISA, Notification of Transmittal of the International Search ?Report and the Written Opinion of the International Searching Authority, or the Declaration, dated Dec. 20, 2021, 15 pages.

\* cited by examiner

PRIOR ART

SPECTRAL GLARE CONTROL EYEWEAR FOR COLOR BLINDNESS AND LOW VISION ASSISTANCE

CROSS REFERENCE TO RELATED APPLICATIONS

This application claims benefit of priority to U.S. Provisional Patent Application No. 63/074,929 titled "Spectral Glare Control Eyewear for Color Blindness and Low Vision Assistance" filed Sep. 4, 2020, which is incorporated herein by reference in its entirety.

This application is also related to U.S. patent application Ser. No. 15/701,729 filed Sep. 12, 2017, now U.S. Pat. No. 10,606,100, which is incorporated herein by reference in its entirety.

NON-PATENT REFERENCES

Foundations of Low Vision: Clinical and Functional Perspectives, $2^{nd}$ Edition. Anne L. Corn and Jane N. Erin (Editors). AFB Press. American Foundation for the Blind, 2 Penn Plaza, Suite 1102, New York, N.Y. 10121.

Color Science: Concepts and Methods, Quantitative Data and Formulae, Günter Wyszecki and W. S. Stiles, Wiley, 1982, ISBN #0471021067.

FIELD OF THE INVENTION

The invention generally relates to optical filters that selectively attenuate the transmission of visible light for the purpose of enhancing or transforming the quality of human vision; to improved designs of such optical filters that provide an improved quality of color vision or of color perception; to methods of improving or enhancing human vision using such improved optical filters; to methods of using such improved optical filters to enhance human vision during outdoor night time viewing conditions; to methods of using such improved optical filters to enhance color perception for persons with color blindness or with color vision deficiency for use during night time conditions while driving a vehicle, navigating a marine vessel or flying an aircraft; methods of using such improved optical filters to reduce the stimulation of the intrinsically photosensitive retinal ganglion cells (ipRGCs); methods of using such improved optical filters to reduce the discomfort of glare; methods of using such improved optical filters to mitigate the symptoms of low vision or age-related visual impairments including for methods of treating or slowing the progression of persons with cone dystrophy including for persons with retinitis pigmentosa; to designs of eyewear systems incorporating such improved optical filters, to methods of testing, recommending and dispensing such improved optical filters for patients with low vision or other visual impairments.

BACKGROUND

Eyewear incorporating tinted lenses may provide relief from glare for persons with normal vision, and for persons with visual impairments resulting from one or more eye conditions such as glaucoma, macular degeneration, retinitis pigmentosa, cataracts, corneal trauma, optic neuritis and other conditions. A tinted lens comprises a substantially transparent lens substrate such as an optical grade plastic or a contact lens polymer, and one or more light-attenuating materials including but not limited to light absorbing dyes and light-reflecting coatings. In particular, tinted lenses that attenuate short wavelengths of light (commonly called blue light, which is light having a wavelength between about 400 nanometers to 500 nanometers), are commonly used to reduce eyestrain and discomfort from the glare of bright lights. Lenses that attenuate wavelengths of light between 400 nanometers to 500 nanometers, and substantially transmit wavelengths of light between 500 nanometers to 700 nanometers, appear to have a yellow tint, or an orange tint, or a brown tint. Tinted lenses that attenuate blue light (between 400 nanometers to 500 nanometers) may also attenuate green light (between 500 nanometers to 550 nanometers). The attenuation of green light significantly reduces the visible luminous transmittance of a tinted lens, which may be useful to reduce eyestrain and discomfort from the glare of bright lights for people with elevated glare sensitivity, which in extreme cases is also called photophobia. Lenses that attenuate both blue and green wavelengths of light while substantially transmitting wavelengths of light greater than 550 nanometers will appear to have a red lens color, or a brown lens color.

It is generally accepted knowledge in the optical lens industry and among optometric practitioners including opticians and optometrists that yellow, orange, red and brown lens colors provide better relief from glare discomfort compared to other lens colors such as gray, green, blue (topaz) and purple (plum). It is also generally known that in low light conditions such as night time use, lenses should have a high transmission corresponding to a visible luminous transmittance (VLT) of 75 percent or greater, or of 80 percent or greater. It is also generally known that in bright light conditions such as during daytime hours and under bright sun, lenses should have a low transmission corresponding to a visible luminous transmittance of between 8 percent and 40 percent.

High-transmission lenses having a yellow or yellow-orange tints are commonly marketed for use as visual aids while driving, along with claims of improved visual contrast. The author has collected several examples of such lenses currently available on the market and measured their spectral transmission, which are shown in FIG. 2. Here, the solid curve 201 corresponds to the Eagle Eyes "StimuLight" lens, an orange lens described as a "Low & Dim Light Vision Boosting Shield." and "revolutionary StimuLight® Lens Technology so you can instantly 'switch on the light' to enhance existing light conditions and help improve definition, clarity and contrast". The dashed curve 202 corresponds to the product with the commercial name "Haven Night Driver". Advertising of this product include claims of "Enhancing Contrast" and "Reducing Glare" in particular for driving at night and under low light conditions. The dotted curve 203 corresponds to the transmission of the Uvex SCT-Orange lens, a darker and deeper orange lens compared to the prior examples. The SCT-Orange lens marketing statements include a claim of improved contrast due to focus blur at low wavelengths "[A] benefit of SCT-Orange relates to eye fatigue. Visible light in the violet and blue areas of the spectrum is not well focused by the eye. When these colors are filtered out, contrast is improved, and the eye finds it easier to see detail." The author does not endorse the veracity of any of the foregoing marketing claims and are only intended as illustrative statements that are typical of marketing claims made regarding high-transmission blue attenuating lenses currently available on the market.

Whereas yellow and yellow-orange lenses having a high transmittance are commonly marketed for glare relief and improving contrast in low light (dusk and night time)

conditions, blue-attenuating lenses having an orange, brown or red tint and a VLT between 8% to 40% are commercially marketed for glare relief during daytime conditions along with claims of improved visual contrast. The author has collected and measured the spectral transmission of several such commercially available eyewear featuring brown lenses, which are shown in the graph of FIG. 3. The solid line 301 corresponds to Cocoons "Hazelnut" lens, 302 corresponds to the Eagle Eyes TriLenium™ brown lens, and 303 corresponds to Johnathan Paul Fitovers "Roadster" lens. Common marketing claims of these products include reducing eyestrain and improving contrast.

Also found in the market today are a substantial number of lenses marketed for use with low vision disorders such as achromatopsia, glaucoma, macular degeneration and retinitis pigmentosa. Example brands include NoIR filters and Corning CPF filters, which may be sold as over the counter devices, but may also be prescribed and dispensed by optometrists. When compared to consumer-oriented products for glare reduction, these lenses typically feature a higher contrast ratio between the attenuating and transmitting spectral regions, and are also available with levels of visible luminous transmittance less than 8 percent, which are also referred to as Category 4 filters in the sunglass industry, or also called "glacier glasses". The author collected popular NoIR and Corning CPF filters marketed for these applications and measured their spectral transmittance, which are depicted in FIG. 4. A popular nomenclature used by optometrists that specialize in dispensing of tinted lenses for low vision patients is based on characterizing the lens transmission spectrum according to the cut-on wavelength, where higher values of cut-on wavelength indicate a stronger amount of filtering. For example a "510" filter refers to a filter with a cut-on wavelength of around 510 nanometers, meaning that it substantially attenuates wavelengths less than 510 nanometers and substantially transmits wavelengths greater than 510 nanometers. FIG. 4 shows a collection of the Corning CPF filters wherein the solid line at 401 is the "CPF 450x", the dashed line at 402 is the "CPF 511x", the dotted line at 403 is the "CPF 527" and the solid line at 404 is the "CPF 550". According to the "Lens Selection" information published online at http://www.cpfglarecontrol.com/Diagnoses_Lens_Selection.html, the "CPF 511" is the "first choice" for persons with macular degeneration, cataracts, glaucoma, Stargardt's disease, and other disorders; the "CPF 527" is the first choice for diabetic retinopathy and retinitis pigmentosa, and the "CPF 550" the first choice for albinism and achromatopsia. These preferences approximately correspond to diseases associated with increasing amounts of glare sensitivity ranging from mild and moderate glare sensitivity to severe photophobia. Continuing with the collection of common NoIR tints, the solid line at 405 is the "NoIR 505", the dashed line at 406 is the "NoIR 533", the dotted line at 407 is the "NoIR 550" and the solid line at 408 is the "NoIR 570". NoIR recommendations (published online at https://noirmedical.com/low-vision/lenses) also follow a similar pattern of suggesting the lower cut-on wavelength and lighter tints for mild glare-sensitive conditions such as macular degeneration and the darker and more comprehensive blue-blocking and green-blocking tints for more severe light-sensitive conditions such as retinitis pigmentosa and achromatopsia.

SUMMARY

The definitions of the following terms are hereby incorporated by reference from U.S. Pat. No. 10,606,100: ophthalmic lens, optical filter, filter, transmittance, visible wavelengths of light, transmittance spectrum (or spectral transmittance), mean transmittance (or average transmittance or average spectral transmittance), luminous transmittance (also called visible luminous transmittance or VLT), monochromatic light, white-point of a filter, correlated color temperature of a filter, method of measurement of the transmittance spectra of filters integrated into an ophthalmic system, method of measuring properties of an ophthalmic lens according to industry-standard conventions, standard dye, narrow-band dye, color blindness, color vision deficiency.

Optical filters are devices having a wavelength-selective transmission function that transforms the spectrum emitted by sources or transforms the spectrum of light received by receivers of light. Optical filters may be incorporated into an ophthalmic device (such as a lens or eye shield) so that the filter transforms the color and intensity of objects and light sources within the visual field of a human observer. An ophthalmic device is a device for use with the eye. Ophthalmic devices comprising optical filters may improve or modify aspects of color vision and may provide therapeutic benefit to persons with low vision disorders and for persons who have visual impairments that cannot be corrected with ordinary refractive lenses, and to persons with other medical conditions such as photosensitive epilepsy. Therapeutic benefits may include reduction of the discomfort from glare, improving color vision, reducing the stimulation of the ipRGCs from artificial light sources including digital display devices, and reducing the stimulation of the rod cones from bright lights. Optical filters may also provide eye-protection from high-energy radiation in the ultra-violet and or infrared spectra. Optical filters may incorporate a linear or circular polarizer, or may be un-polarized. Optical filters may incorporate photochromic dyes or thermochromic dyes or electrochromic dyes that may provide a spectral transmission with a time-variable component. Apparatus incorporating optical filters include eyewear, contact lenses, scope assemblies, cameras, windows, coatings and lamp assemblies. Such apparatus may be generally referred to as optical devices or optical systems.

In one aspect of the claimed invention and/or inventions of this disclosure, an ophthalmic lens has a spectral transmittance comprising a notch filter substantially blocking wavelengths between a lower wavelength boundary and an upper wavelength boundary, where the lower wavelength boundary is between 450 nanometers to 480 nanometers and the upper wavelength boundary is between 500 nanometers and 520 nanometers, and the spectral transmittance substantially transmits wavelengths outside the notch filtering region. The location of the wavelength boundaries are defined using the full-width half-maximum method when analyzing the notch filter on a logarithmic transmittance scale (also called its optical density). In some embodiments the maximum spectral transmittance of the lens (the greatest value of the spectral transmittance within a spectral band) between 460 nanometers to 510 nanometers is less than 50 percent of the luminous transmittance of the filter, and the minimum spectral transmittance of the lens between 550 nanometers and 700 nanometers is greater than 60 percent, and the mean transmittance of the filter between 400 nanometers and 450 nanometers is at least 4 times greater than the mean transmittance of the filter between 460 nanometers and 500 nanometers.

In some embodiments the notch filter is formed by incorporation of an absorptive dye into the lens and the peak optical density of the absorptive dye is at least 2 (equivalent to a transmission of 10 (ten) raised to the power −2 (minus two), or 1 percent). In some embodiments the visible luminous transmittance of the lens (or VLT) is between 65 percent and 80 percent. In some embodiments the width of the notch filter is greater than 20 nanometers. In some embodiments the ophthalmic lens has a VLT that is 80 percent plus or minus 3 percent. In some embodiments the ophthalmic lens has a VLT (visible luminous transmittance) is 75 percent plus or minus 3 percent. In some embodiments the VLT of the lens is between 40 percent and 75 percent plus or minus 3 percent. In some embodiments the VLT of the lens is between 60 percent and 85 percent plus or minus 3 percent in the optical center of the lens and the VLT of the lens is between 40 percent to 60 percent in a in a non-central region of the lens, wherein the optical center of the lens is the portion of the lens the eye looks through when looking straight ahead under the typical position of wear of the spectacle frame or similar such device.

In another aspect, a method of improving the vision of a person comprises positioning an eyewear device having an ophthalmic lens of any of the foregoing embodiments in front of the eyes so that the person's field of view is substantially filtered by the spectral transmission of the ophthalmic lens. In some variations the method provides relief from the discomfort of glare caused by bright lights. In some variations the person suffers from an elevated sensitivity to glare.

In another aspect, a method of improving the ability to interpret traffic signal lights by a person with color vision deficiency (also called color blindness) comprises looking through such a lens at night time while operating a road vehicle. In some embodiments the lens is incorporated into a spectacle frame. In some embodiments the lens is incorporated into a window section with means to attach the window section onto a structural member of the interior of a vehicle. In some embodiments the lens is incorporated into a window section that attaches onto the sun visor of a car.

In another aspect, a method of improving the ability to interpret air traffic control signal lights by a person with color vision deficiency (also called color blindness) comprises positioning device in front of the eyes of a person with color blindness so that the field of view is at least partially transformed by the transmission spectrum of the lens or eye shield or visor, and the person then looking through the device at a colored indicator light in the distance, and interpreting the apparent color of the indicator light as seen through the device to navigate a transport vehicle wherein the transport vehicle is a car, boat or aircraft. In some embodiments the lens is provided in the form of a shield integrated with an airman's helmet system. In some embodiments the lens is incorporated into a spectacle frame. In some embodiments the lens is attached to a window of the transport vehicle. In some embodiments the lens is attached to the body of the transport vehicle and acts as a visor.

In another aspect, a method of inhibiting the stimulation of the intrinsically photosensitive Retinal Ganglion Cells (ipRGCs) within the retina comprises waiting until the start of dusk or night time conditions, then positioning such a lens over the eyes so that it substantially transforms the field of view, and retaining the lens in said position until the person goes to sleep. The effect of wearing the lens is to provide relief from melanopic suppression caused by viewing of computer displays and use of artificial illumination at night, thereby resulting in improved quality of sleep and circadian rhythm entrainment. In some embodiments the lens is worn for at least a period of two hours prior to the person going to sleep.

In another aspect, a method of slowing the progression of a progressive cone dystrophy disease comprises the person being diagnosed with a cone dystrophy and then positioning a device comprising such a lens over the eyes during a substantial portion of daytime hours on a daily basis so that the overstimulation and bleaching of the retinal rod cells is reduced, and consequently reducing the quantity of transretinal released into the retinal pigment epithelium, thus extending the life span of the retinal pigment epithelium.

In another aspect, an ophthalmic lens comprises at least two spectral notch-filters wherein the first notch filter substantially attenuates light between 460 nanometers to 500 nanometers, and the second notch filter attenuates light between 560 nanometers to 590 nanometers, and the mean spectral transmittance between 560 nanometers to 590 nanometers is at least two times greater than the mean spectral transmittance between 460 nanometers to 510 nanometers, and the VLT of the lens is less than 40 percent, and the average spectral transmittance between 610 nanometers and 670 nanometers is at least two times greater than the VLT of the lens. In some embodiments the VLT is less than 15 percent. In some embodiments the VLT is less than 4 percent. In some embodiments the maximum spectral transmittance between 400 nanometers to 600 nanometers is less than 5 percent.

In another aspect, a method of slowing the progression of a progressive cone dystrophy disease and also improving the color vision for the wearer, comprises wearing the lens described above during daytime hours so that the overstimulation and bleaching of the retinal rod cells is reduced, and consequently reducing the quantity of trans-retinal released into the retinal pigment epithelium, thus extending the life span of the retinal pigment epithelium. In some embodiments the method comprises wearing a lens with a VLT between 60 percent and 85 percent in indoor lighting conditions. In some embodiments the method comprises wearing a lens with a VLT between 1 percent and 15 percent in outdoor daylight conditions.

In another aspect, a method of providing relief from the glare of bright light while recovering from cataract surgery comprises the person undergoing an operation to remove a cataract and then the person positioning a device incorporating the lens described above in front of their eyes so that the field of view is substantially transformed by the lens, and then wearing the device daily for a period of at least 1 week, wherein the lens worn for indoor conditions has a VLT between 25 percent to 40 percent and a lens worn for outdoor daylight conditions has a VLT between 3 percent to 40 percent.

In another aspect, a method of providing relief from the glare of bright light to a person with photophobia comprises wearing the lens described above in outdoor daylight conditions wherein the lens has a VLT between 3 percent to 40 percent, and wearing the lens described above in indoor conditions wherein the lens as a VLT between 25 percent to 40 percent.

In another aspect, a system for providing relief from the glare of bright light, and also providing better color vision to a person with low vision, vision loss, visual impairment or age-related loss of color discrimination comprises a first eyewear device having an ophthalmic lens with a spectral transmittance comprising a single notch filter that substantially attenuates the transmission of light between 450 nanometers and 510 nanometers and has a VLT greater than 40 percent, and a second eyewear device having an ophthalmic lens with a spectral transmittance comprising two notch filters that substantially attenuate the transmission of light between 450 nanometers and 510 nanometers and between 560 nanometers and 590 nanometers, and the VLT of the lens is between 3 percent and 40 percent.

In another aspect, a method of improving vision comprises selecting an ophthalmic lens depending on the level of average surface illumination and then positioning a device comprising the lens over the eye so that the lens substantially transforms the field of view wherein if the average surface illumination is between 0.001 and 100 lux, the lens the luminous transmittance of the lens is between 60% and 85%, the maximum transmittance of the lens between 460 nanometers to 510 nanometers is less than 75 percent of the luminous transmittance of the filter, the minimum transmittance of the lens between 550 nanometers and 700 nanometers is greater than 60 percent, and the mean transmittance of the filter between 400 nanometers and 450 nanometers is at least 4 times greater than the mean transmittance of the filter between 460 nanometers and 510 nanometers, or if the average surface illumination is between 101 and 1000 lux, the luminous transmittance of the lens is between 8% and 40%, the maximum transmittance of the lens between 460 nanometers to 510 nanometers is less than 5 percent, the transmittance of the lens between 520 nanometers and 540 nanometers is greater than the luminous transmittance of the lens, the transmittance of the lens between 600 nanometers and 700 nanometers is greater than the luminous transmittance of the lens, and the mean transmittance of the filter between 400 nanometers and 450 nanometers is at least 4 times greater than the mean transmittance of the filter between 460 nanometers and 510 nanometers, or if the average surface illumination is greater than 1001 lux, the luminous transmittance of the lens is between 1% and 7%, the maximum transmittance of the lens between 460 nanometers to 510 nanometers is less than 1 percent, the transmittance of the lens between 520 nanometers and 550 nanometers is greater than the luminous transmittance of the lens, the transmittance of the lens between 600 nanometers and 650 nanometers is greater than 10%, and the mean transmittance of the filter between 400 nanometers and 450 nanometers is at least 4 times greater than the mean transmittance of the filter between 460 nanometers and 500 nanometers. In some variations the method consists of a subset of the aforementioned lighting conditions and lens selections. In some variations the method is performed by a person with low vision wherein low vision is a condition caused by eye disease in which visual acuity is 20/70 or poorer in the better-seeing eye and cannot be corrected or improved refractively. In some variations the person has an elevated sensitivity to glare wherein glare is a visual condition caused by a significant ratio of luminance between the average surface illumination and the glare source where the glare source is a region within the visual field having a luminance that is significantly higher than the average surface illumination and the glare source causes an instinctive desire to look away from the region of higher luminance due to an elevated sensitivity to bright light and/or excessive luminance of the glare source. In some variations the method is performed by a person who is susceptible to epileptic seizures caused by visual stimuli and the device reduces the frequency or intensity of the epileptic seizures.

DETAILED DESCRIPTION

Figure 1:
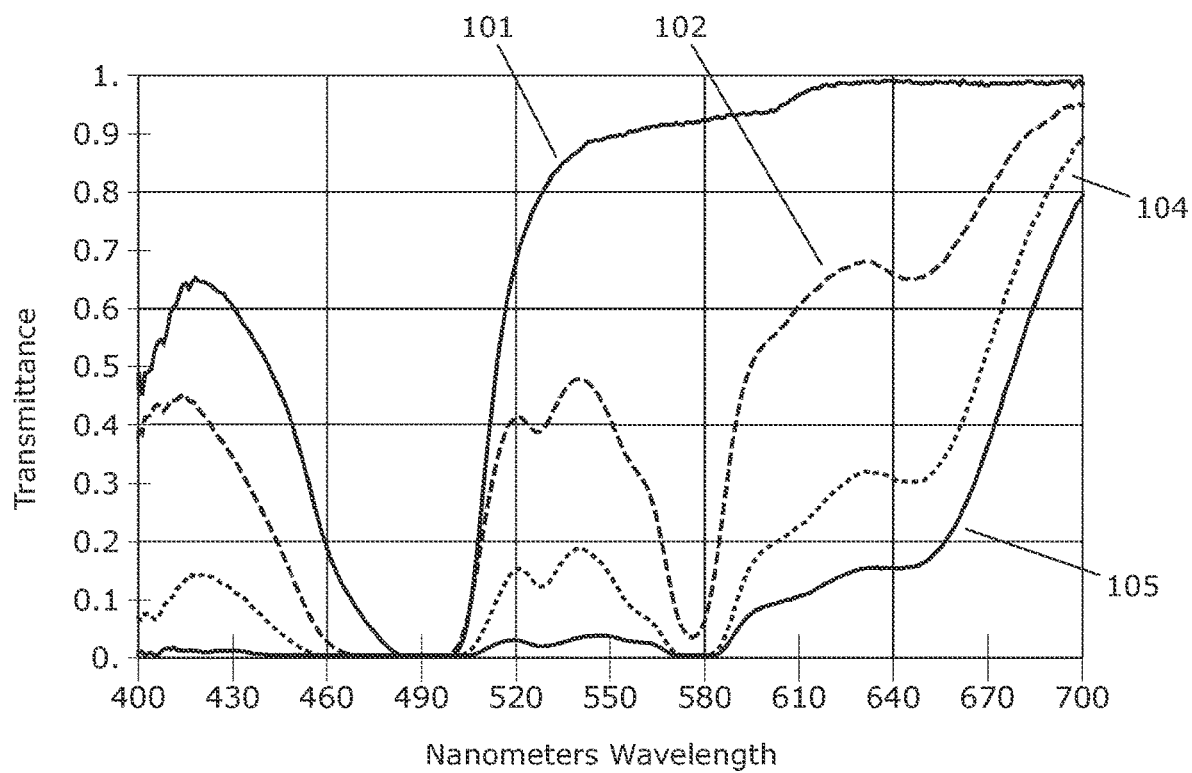
FIG. 1: Graphs of the spectral transmittance of four embodiments corresponding to inventive ophthalmic filters from the present disclosure.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

The teachings of the present disclosure may be beneficially read along with a general understanding of the science of optics, the science of human color vision, the science of colorimetry and related topics. For a general reference on these topics see, for example, Günter Wyszecki and W. S. Stiles, "Color Science: Concepts and Methods, Quantitative Data and Formulae", Wiley, 1982, ISBN #0471021067.

The teachings of the present disclosure may be beneficially read along with a general understanding of the principles of low vision optometry. For a general reference on these topics see, for example, Anne L. Corn and Jane N. Erin (Eds.), "Foundations of Low Vision", AFB Press, 2010, ISBN #978-0-89128-883-1.

Without loss of generality, the present disclosure may presume a conventional configuration of the human visual system: specifically, unless stated otherwise, that of the photopic color vision of a normal human observer having a 2-degree field of view. Photopic color vision occurs when the level of illumination is high enough that the rod photoreceptor cells are not active, e.g. when average surface illumination is about 10 lux or greater. In this disclosure color appearance models are calculated using the CIE 1931 xy color space and the CIE 1931 Standard Observer with a 2-degree field of view, unless stated otherwise. For the practitioner with ordinary skill in the art, these teachings provide sufficient instruction to apply the teachings to alternative observer models, including, for example, use of the CIE 1964 10-degree Standard Observer, or with other color spaces such as the CIE 1976 L*u'v'color space.

In the present disclosure, Illuminant D65 (D65) refers to light having the typical spectral radiant flux of daylight with a correlated color temperature of 6500 Kelvin, and is defined by joint ISO/CIE standard ISO 10526:1999/CIE 5005/E-1998. References to "daylight", "sunlight" or "average daylight" in this disclosure refer to Illuminant D65. Illuminant E refers to an ideal light defined as having equal power per wavelength. Illuminant A refers to a light, typical of incandescent bulbs, defined as having the spectral radiant flux of an ideal black-body radiator according to Planck's Law with a correlated color temperature of 2848K. The family of lights comprising Illuminant FL1 through FL12, which represent the spectral radiant flux of typical types of fluorescent lamps, is defined by CIE Publication 15:2004. The Munsell colors are a set of color swatches that are formulated with specific pigments to establish a standard for colors that is defined at the spectral domain. The Munsell colors are available in printed form in The Munsell Book of Color, Glossy Edition, ISBN #9994678620, 1980. Measurement of the spectral reflectance of the Munsell colors are published by Parkkinen J. P. S., Hallikainen J. and Jaaskelainen T., "Characteristic spectra of Munsell colors.", Journal of the Optical Society of America A, vol. 6, no. 2, 1989, pp. 318-322. The Farnsworth D-15 is a standardized color discrimination test comprising 15 Munsell color samples that form a contour with chroma of between 2 and 4 on the Munsell scale. The Farnsworth D-15 is described by the publication "The Farnsworth dichotomous test for color blindness panel D15 manual", New York: Psych Corp; 1947, Farnsworth D.

Improved Ophthalmic Filters for Glare Reduction

It is generally known in the field of ophthalmic optics that the incorporation of a blue-attenuating filters into eyewear lenses (including spectacle lenses, contact lenses, eye shields, face shields, visors, windows, etc), may reduce the perceived discomfort of glare caused by bright light. Blue-attenuating filters have a white-point color that can be described as yellow, yellow-orange, orange or brown. For a filter that comprises only absorptive materials, the filter color appearance is the same as the white-point of the filter. For filters comprising only reflective materials (for example dielectric mirror coatings or metallic coatings) the lens color appearance is the complementary color to its white-point. For filters containing a combination of reflective and absorptive filtering, the filter color appearance may vary depending on which side of the combination filter is viewed. As described in the background section above, commercially available blue-attenuating eyewear have a spectral transmittance that substantially reduces the transmission of wavelengths of light between 400 nanometers to 500 nanometers, while passing a relatively greater proportion of light for wavelengths between 501 nanometers to 700 nanometers. In some cases the "cut on" wavelength of such filters may vary between 500 nanometers to as high as 570 nanometers. The manufacturing of these filters characterized by the spectral features of these commercially available products is most commonly accomplished by incorporating one or more absorptive materials into an optical lens substrate. Examples of the absorptive materials that provide a blue-light attenuation effect to a lens include Solvent Yellow 33 and Solvent Orange 60. Blue-light attenuation may also be accomplished by use of reflective coatings, which generally impart a blue reflection or blue mirror type appearance to the front surface of a filtering lens. A combination of reflection and absorption may also be employed to accomplish similar filtering effects.

A general problem with present commercially available blue-light attenuating filters is reduced quality of color vision, in particular for blue colors. For example, eyewear that have the filters that broadly attenuate blue from 400 nanometers to 500 nanometers cause the color of the sky, which is normally seen as blue, to appear "washed out" or desaturated and in some cases has a slightly greenish appearance, which people find to be unpleasant when wearing the eyewear. In another example, the appearance of dark blue colors, such as a navy-colored fabrics, may appear to be black, which people find to be a confusing and unnatural color appearance. Unpleasant visual experience and color confusions contribute to a perceived worsening in overall quality of vision. If the user does not enjoy wearing a blue-attenuating eyewear, they will tend to wear it less often and therefore obtain less utility from the device over its lifespan. The present disclosure is directed toward improved filters that provide relief from the discomfort of glare and heightened visual acuity while at the same time preserving the quality of color vision, and methods of using such filters to improve the quality of vision.

The insight that enables and unites the claimed inventions is that conventional broad-bandwidth blue-light attenuating filters cause undesirable side effects on color vision due to filtering a broader range of wavelengths of light than is actually required to accomplish the desired reduction of glare. Specifically, by filtering a narrow band of light corresponding to the longer wavelength portion of blue light between about 460 nanometers to about 500 nanometers or to about 510 nanometers, an improved filter can be formed that also provides equivalent glare reduction, but in combination with improved color vision and improved perception of blue colors. Filters that accomplish this form of selective spectral filtering may be economically manufactured using narrow-band dyes also sometimes referred to as functional dyes by fine chemical manufacturers.

Figure 5:
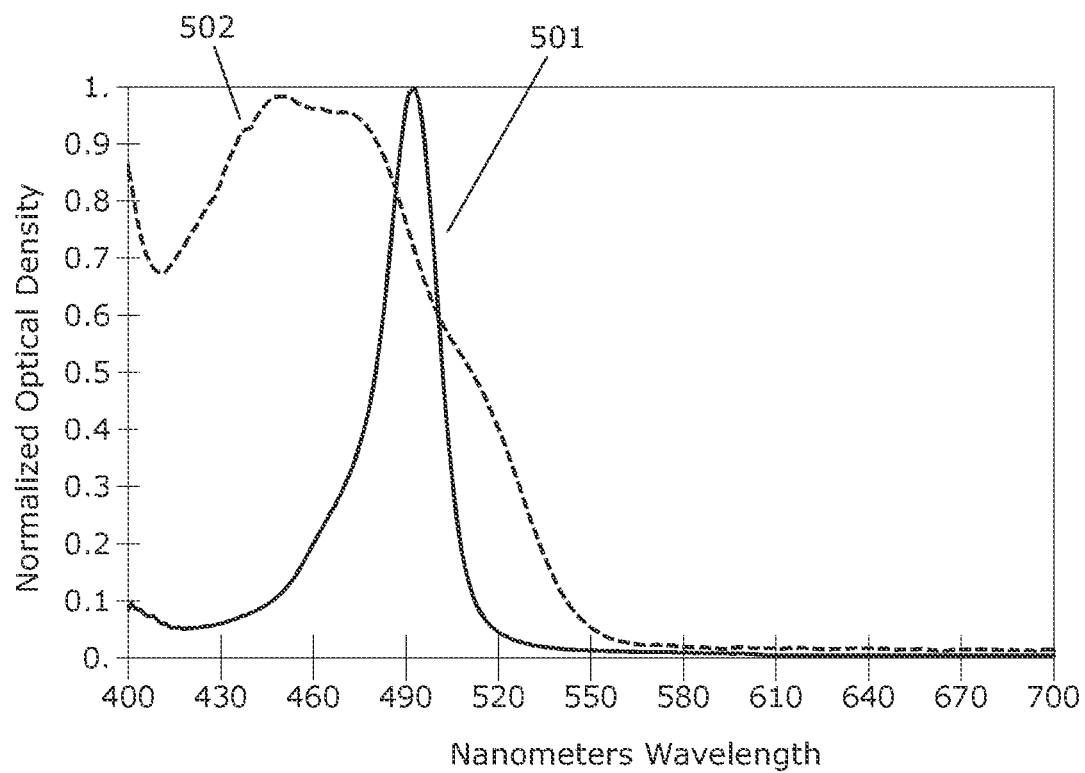
FIG. 5: Graphs of the normalized optical density spectrum of two absorptive dye chemicals: one of which has a narrow band absorptance, and the other having a broad spectral absorptance, and both dyes imparting an yellow-orange color to a lens.
Figure 6:
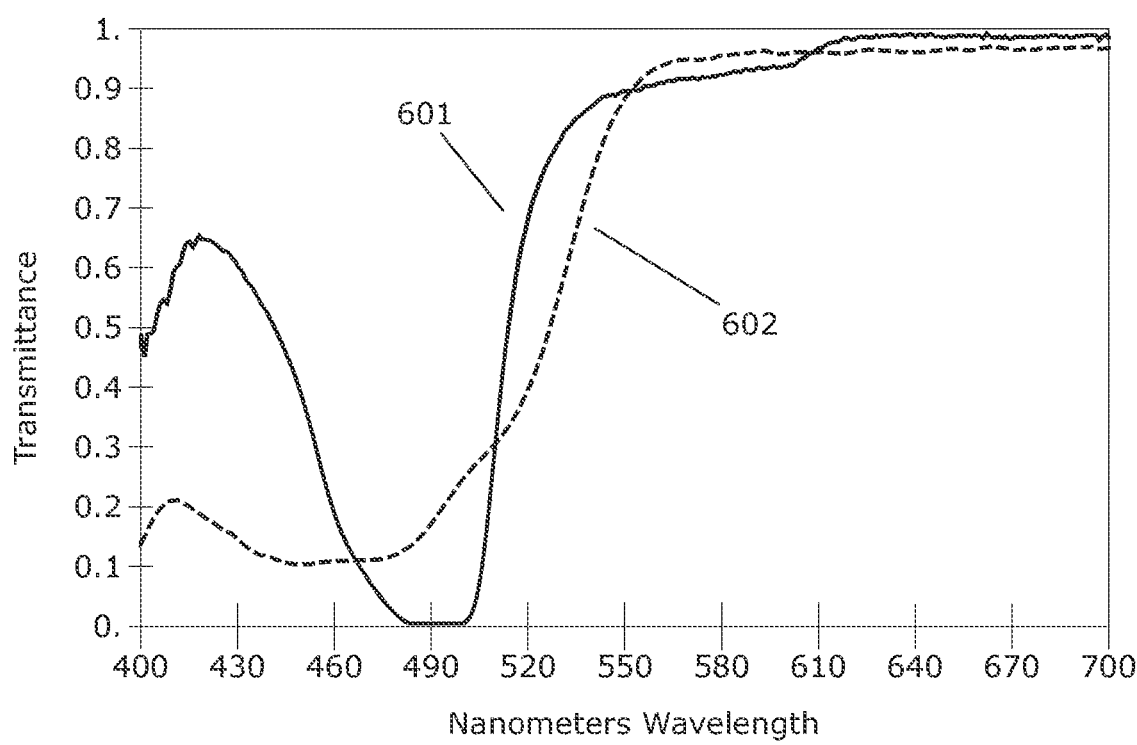
FIG. 6: Graph of the spectral transmittance of two examples of ophthalmic lenses comprising the exemplary dyes shown in FIG. 5, with both filters providing a VLT of 80 percent.

To better understand the difference between conventional broad-band blue absorbers and an improved narrow-band blue absorber, the graph of FIG. 5 shows the optical density spectrum of two types of absorptive dyes: at 502 the dotted line shows a conventional broad-band dye (specifically, Solvent Orange 60, commercially available from Milliken Chemical under the trade name Keyplast Orange LFP and CAS #6925-69-5) that is typical of what is used in conventional blue-light absorbing lenses found on the market today. The broad band dye attenuates wavelengths of light between 400 to 500 nanometers. The solid line at 501 shows a narrow-band dye that can be used to manufacture an improved type of lens for glare reduction. The narrow-band dye strongly attenuates light with wavelengths between 480 nanometers to 500 nanometers, with relatively weak attenuation of light at other wavelengths. Narrow band dyes having this property are available from a small number of specialty & fine chemical suppliers with trade-secret molecular structures and not having a published CAS number. FIG. 6 demonstrates the effect of these two dye species when incorporated into an optical filter: the dashed curve at 602 shows the transmittance of a sample lens formed from the conventional dye, with an optical density of around 1.0 at the wavelength of peak absorption of 450 nanometers. The spectral transmission function can be observed to generally attenuate wavelengths of light between 400 nanometers to 500 nanometers, while substantially passing wavelengths of light greater than 550 nanometers, and having a smooth transition between the attenuating and transmitting spectral bands. A lens with the foregoing spectral transmission is characterized by having a visible luminous transmittance (VLT or luminous transmittance) of about 80%, which is also called a Category 0 filter according to the ANSI Z80.3 filter classification system. The solid curve at 601 shows the transmittance of a sample lens formed from the narrow-band dye formulated to a peak optical density of around 3.5 (three and one half). This transmission function can be observed to generally attenuate strongly wavelengths of light between about 460 nanometers to 500 nanometers, while transmitting wavelengths of light between 400 nanometers to 450 nanometers, and for wavelengths of light greater than 510 nanometers. The dye provides for filters that have a significant contrast ratio between the transmission of the short wavelengths of blue light (between 400 to 450 nanometers) and the long wavelengths of blue light (between 460 to 500 or to 510 nanometers). The contrast ratio may be characterized by a ratio in the mean transmittance of four to one between the short and long wavelength blue regions. The transmission function has a relatively steep slope at the boundaries between attenuating and transmitting spectral bands. This second filter example has a luminous transmittance of about 80%.

Figure 2:
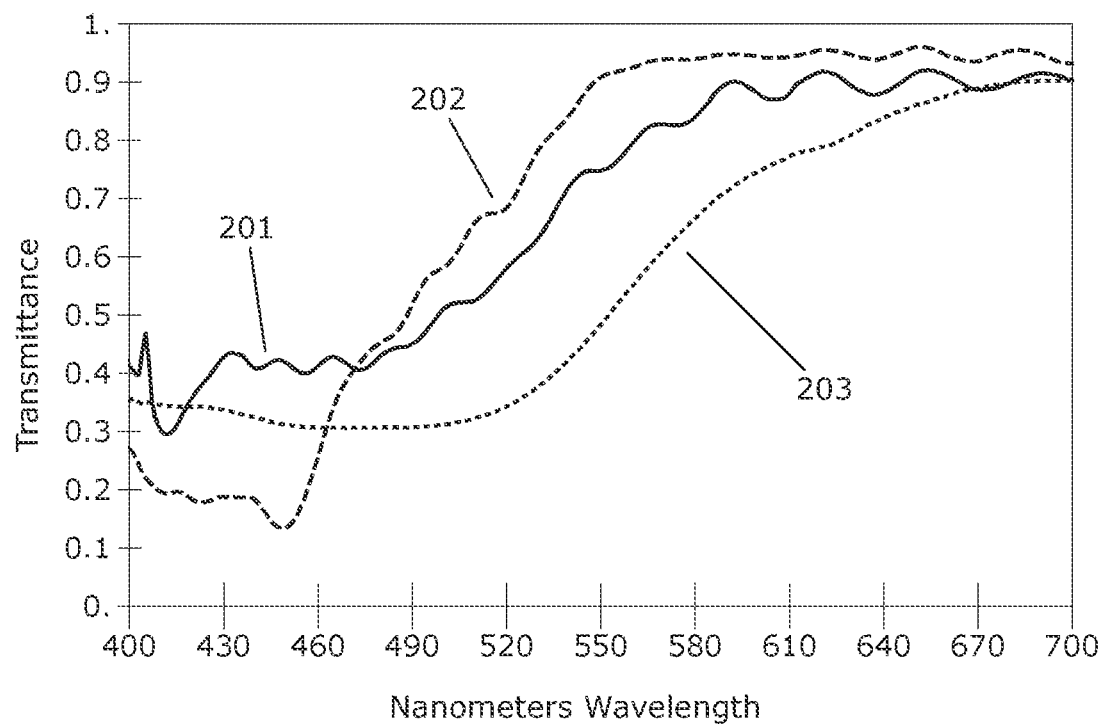
FIG. 2: Graphs of the spectral transmittance of various ophthalmic filters known in the prior art for providing glare attenuation and enhancement of vision while driving at night.

In subsequent description of this disclosure the filter shown by the transmission curve at FIG. 6 dotted line 602 will be referred to as a conventional high-transmission blue-attenuating filter. This example of a conventional high-transmission blue-attenuating filter has reasonably similar properties to commercially available products commonly sold for glare reduction in low-light conditions such as the Eagle Eyes StimuLight and Haven NightDriver, which have been previously discussed along with FIG. 2.

In subsequent description of this disclosure the filter shown by the transmission curve at FIG. 6 solid line 601 will be referred to as an improved high-transmission blue-attenuating filter. In subsequent description the properties of the improved high-transmission blue-attenuating filter will be compared to the conventional high-transmission blue-attenuating filter.

The general characteristics of the improved high-transmission blue-attenuating filter, as described above, include a range of luminous transmittance between about 60 percent to about 85 percent, and a spectral notch feature existing between about 460 nanometers and 510 nanometers, wherein the maximum spectral transmittance is less than 50 percent of the overall luminous transmittance of the filter and the notch filter provides a transmission contrast ratio of 4:1 or greater between the shorter wavelengths of blue light (those between 400 to 450 nanometers) to pass through the filter while strongly attenuating the longer wavelengths of blue light (those between 460 nanometers and 500 nanometers). Furthermore, the improved filter substantially transmits light having wavelengths greater than 550 nanometers, for example the minimum spectral transmittance over this range of wavelengths is generally greater than 60 percent. Preferable embodiments provide an optical density that is greater than or equal to 2 (two) within the notch filter region of the spectrum, which is equivalent to having a wavelength of minimum spectral transmittance that is less than or equal to 1 percent within the region of 460 nanometers to 500 nanometers.

When the filter is incorporated into an ophthalmic lens, the foregoing spectral characteristics are preferably provided at the optical center of the lens. Any suitable measurement method may be used to measure the spectral characteristics of a lens, for example by averaging the spectral transmission over a region corresponding to at least a 10 degree field of view when said lens is incorporated into an optical device for use with the eye.

In some lenses the spectral transmission may vary over different regions of the lens, for example having a gradient transmission where the lens has a lower luminous transmittance in an upper portion of the lens, and a higher transmission at the optical center of the lens. In some embodiments the luminous transmittance of the lens is between 40 to 60 percent in the non-central region, and is between 60 to 85 percent in the central region.

In some embodiments the lens is intended for use in dusk or night time conditions where the average surface illumination is between 0.0001 lux and 100 lux. In this lighting condition it is preferable that the lens is characterized by having a luminous transmittance of 75 percent plus or minus 3 percent. In some embodiments it is preferable that the lens is characterized by having a luminous transmittance of 80 percent plus or minus 3 percent. The range of plus or minus 3 percent is a generally accepted manufacturing tolerance for luminous transmittance of lenses having a target luminous transmittance of 75 percent or of 80 percent. Lenses that are characterized by having a luminous transmittance of less than 80 percent or of less than 75 percent may be considered unacceptably dark for use during night time conditions.

Figure 7:
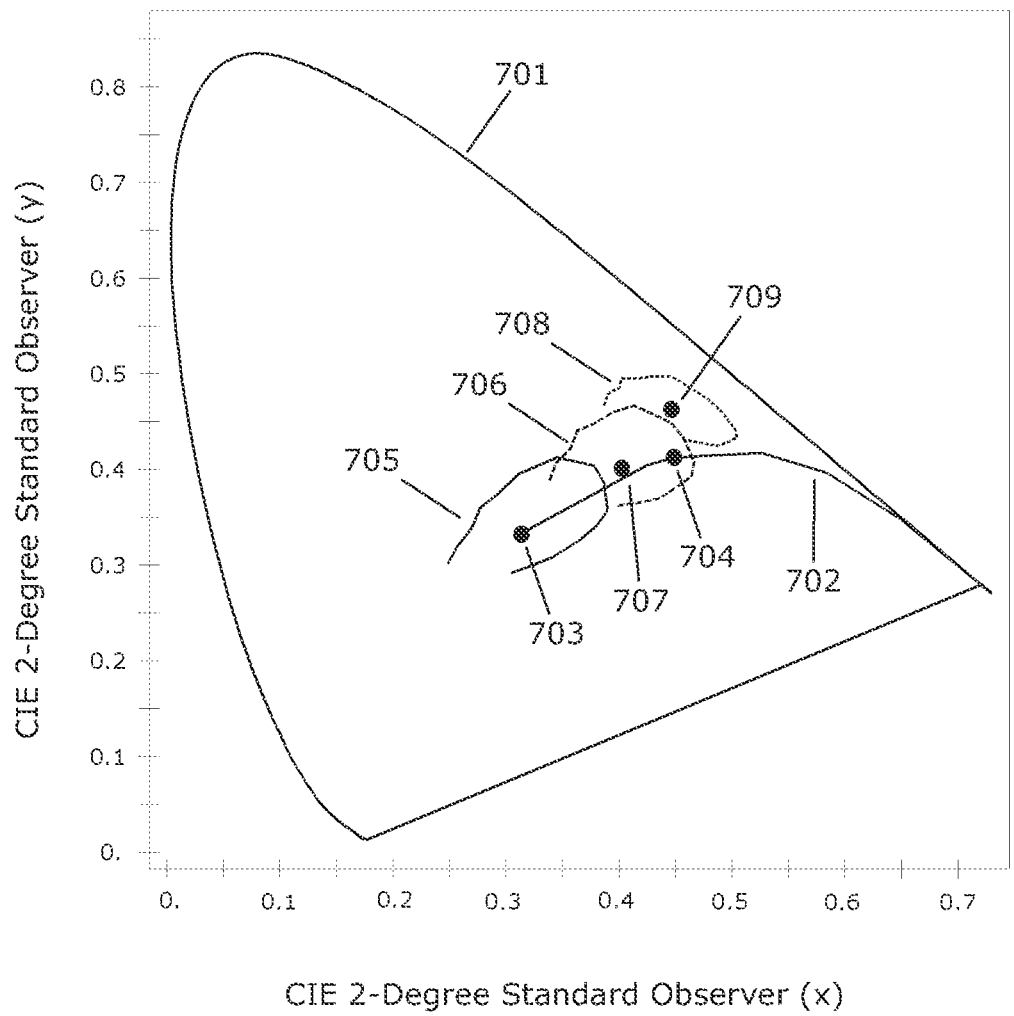
FIG. 7: Diagram showing the chromaticity white points and color rendering of the Farnsworth D-15 colors on a CIE chromaticity diagram, as viewed under an unfiltered reference observation condition under daylight, and to as viewed through the two exemplary lenses as shown in FIG. 6.

Improved high-transmission blue-attenuating filters provides better quality of color vision when compared to a conventional high-transmission blue-attenuating filter. The quality of color vision provided by each filter can be understood by interpreting the graph shown in FIG. 7, which provides various plots and reference points in a chromaticity space. The CIE 2-Degree Standard Observer is used in this plot, however without loss of generality any suitable color space can be used to perform this type of analysis. In FIG. 7, the solid contour 701 corresponds to the chromaticity locus. The reference point 703 is the location of the D65 Standard Illuminant (standard daylight). The solid curve 705 corresponds to the chromaticity contour formed by the Farnsworth D15 colors, as seen under Illuminant D65 with no intervening filters. This forms a reference condition for unaltered color vision. The contour 702 follows the black-body locus from zero to 6500 Kelvin. Along this contour the reference point 704 corresponds to Illuminant A, which has a correlated color temperature of between 2800 Kelvin and 2700 Kelvin. Illuminant A is the lowest color temperature of light that is generally considered acceptable for general illumination. Illuminant A is a typical color for residential indoor lighting, and for incandescent-type bulbs. The reference point at 709 corresponds to the white-point of the conventional high-transmission blue-attenuating filter. The dotted contour at 708 corresponds to the color appearance of the Farnsworth D15 colors as seen through the conventional high-transmission blue-attenuating filter. The poor quality of color vision provided by the conventional filter can be readily observed from this graph: 1) the correlated color temperature that is less than 2700 Kelvin, 2) the white-point is above the black-body locus, and 3) the color rendering of the D15 colors is substantially collapsed along the blue-yellow direction. According to the author's understanding of optimal filter design the preferable properties of filters for ophthalmic use are: 1) the correlated color temperature should be greater than 2700 Kelvin, 2) the white point should be on or below the black-body locus and 3) the filter should provide a good quality of color vision along both blue-yellow and red-green directions in color space. All of these preferable properties are satisfied by the improved high-transmission blue-attenuating filter. Referring again to FIG. 7, the reference point 707 corresponds to the white-point of the improved filter, which is essentially on the black-body locus and has a correlated color temperature of about 4000 Kelvin. The dashed contour 706 corresponds to the color appearance of the D15 colors as seen through the improved filter, which can be appreciated here has a balanced structure providing good color vision along both blue-yellow and red-green directions of color space.

As discussed above, eyewear with blue-attenuating lenses are marketed as reducing glare. A popular theory to explain the glare reduction is that blue light, having shorter wavelengths than other colors of light, is "more scattered", that scattering of light is the fundamental reason for poor visibility in glare conditions, and that by attenuating the intensity of blue light, visibility in glare conditions can be improved. Glare conditions are generally understood to occur when high intensity light is facing toward the viewer, for example in the headlights of oncoming traffic at night, or when the sun is at a low angle in the sky and ahead of the viewer—which is a common problem experienced when driving in the afternoon hours especially in the winter season. There are several problems with this popular theory: 1) it does not distinguish between two aspects of glare, which are generally understood in the field of low vision optometry to be separate phenomena but are not widely known to the public: disability glare is the reduced ability to see objects which are masked by glare and glare discomfort which is the pain or aversion to bright light; 2) there is no underlying explanation for the cause of glare discomfort and no way to objectively measure it; and, 3) the claims that scattering of blue light causes glare is contravened by the fact that blue light has very low visibility and therefore is unlikely to have a substantial contribution to the disabling effects of glare.

Figure 16:
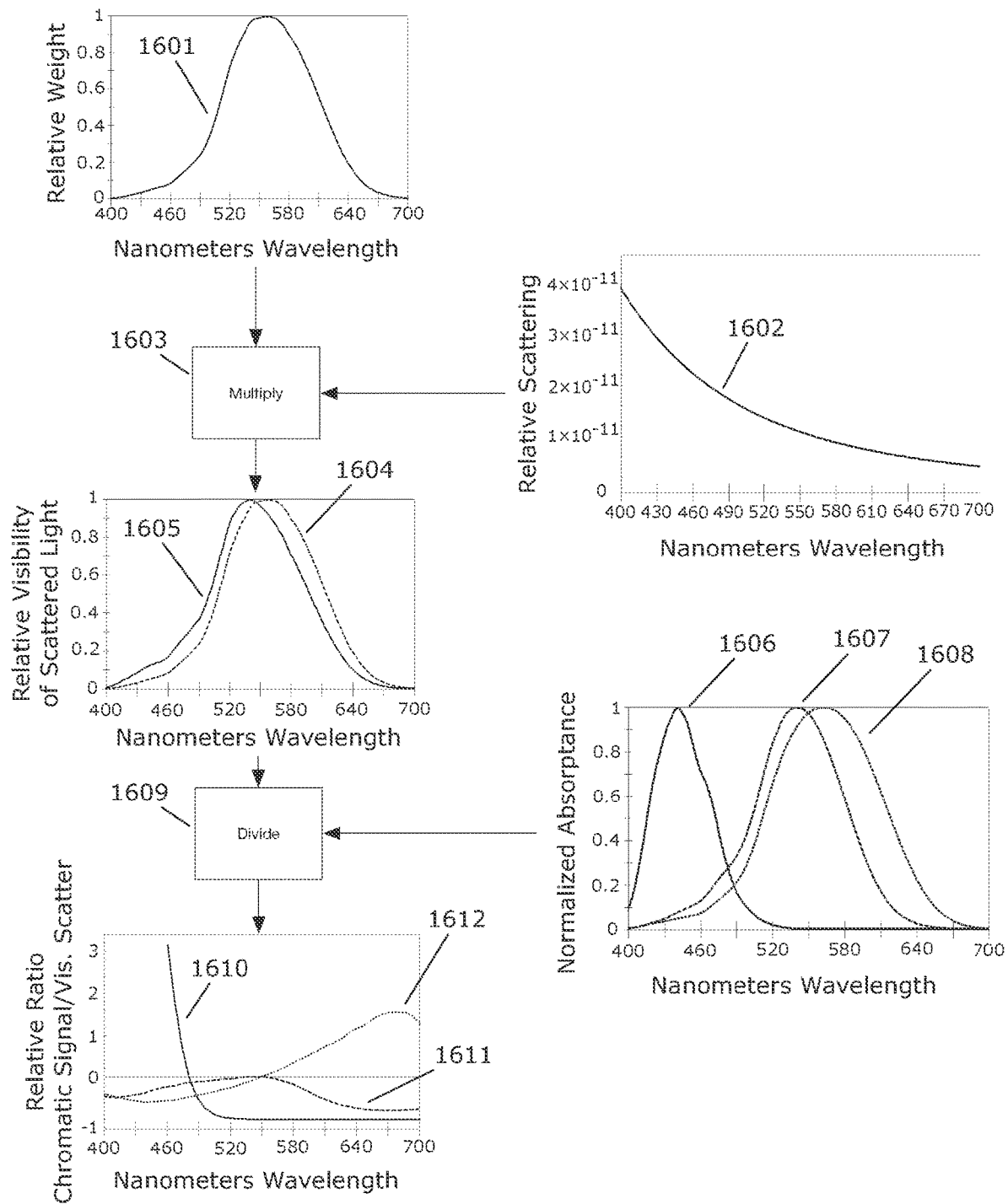
FIG. 16: Diagram depicting the calculation of the photopic visibility of Rayleigh scattering and the ratio of perceived intensity of scattering as a function of each class of retinal cone cell.

The contribution of scattering to disability and discomfort glare is commonly discussed in marketing claims of blue-light attenuating eyewear devices, however the author is not aware of a comprehensive theory of the contribution of scattering that can be used to form an analytical measurement of the effect of scattering on vision. Toward this goal, the author has conducted an analysis of the relative visibility of scattering and its relative effect on color perception which is explained by the graphs of FIG. 16. In this figure, the solid line graph at 1601 corresponds to the photopic luminous efficiency function, and the solid line at 1602 corresponds to the relative intensity of scattered light according to Rayleigh theory, which states that scattering is proportional to the 4th power of the wavelength of light. It may be appreciated from this graph that scattering is substantially greater at 400 nanometers than compared to that at wavelengths above 600 nanometers. This substantial difference is obviously the basis of marketing claims regarding the utility of attenuating blue light. However, if the two curves are multiplied together, as represented by the boxed operation at 1603 the resulting product gives the weighting function at 1605 which corresponds to the relative visibility of scattered light. This may be compared to the photopic luminosity function shown in the dotted line 1604, by which it may be readily noticed that the visibility of scattered light is only slightly blue shifted relative to the photopic luminosity function. In the author's opinion this analysis raises doubt that the short wavelengths of light actually contribute to the perception of scattering, since the light of wavelengths less than 450 nanometers where scattering is greatest are also wavelengths of light where the eye has very low sensitivity. The analysis benefits further by examining the ratio between the relative visibility of scattered light, versus the normalized absorptance of the S-, M- and L-cone sensitivity functions. The solid graph at 1606 corresponds to the S-cone sensitivity, and the dashed line at 1607 corresponds to the M-cone sensitivity, and the dotted line at 1608 corresponds to the L-cone sensitivity. A ratio may be calculated between each of these cone sensitivity functions and the relative visibility of scattered light (as calculated above); with the ratio operation being represented by the box at 1609, and resulting in the three curves at 1610, 1611 and 1612 corresponding to the ratio of relative visibility of scattered light divided by the S-, M- and L-cone sensitivity, respectively. Herein it may be seen that the reduction of perceived scattering is most effective for wavelengths of light between 480 nanometers to 550 nanometers, and has relatively little contribution at other wavelengths.

Figure 8:
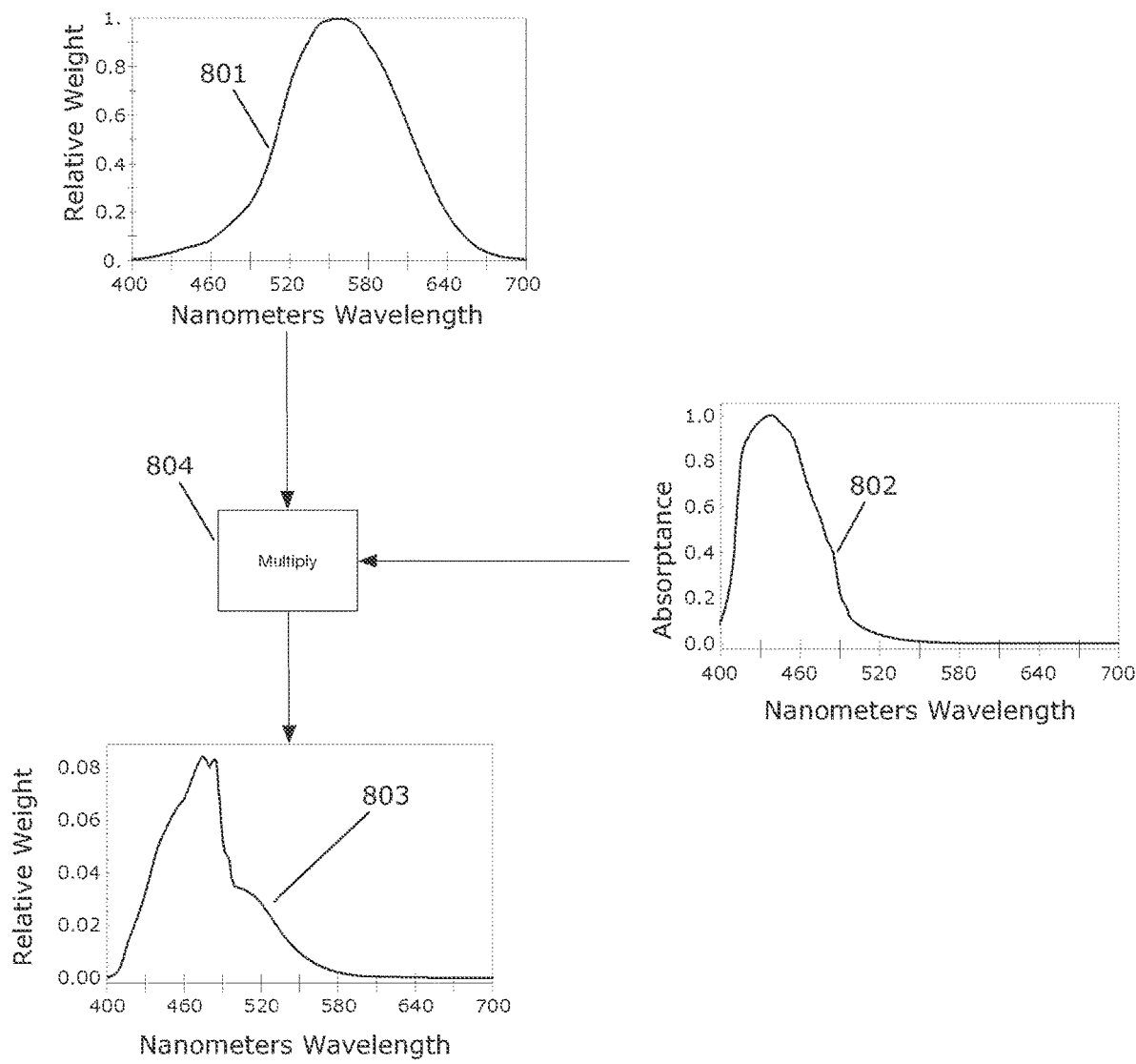
FIG. 8: Diagram showing the calculation of a weighting function for measuring the perceived discomfort of glare.

Glare discomfort is the pain experienced by looking at bright lights, especially in high contrast conditions for example bright lights with a dark background. Glare discomfort is generally known to be greater for lights that have power concentrated at short wavelengths (blue light) compared to lights that have power concentrated at longer (red) wavelengths. The glare aversion response can be elevated for people with eye diseases which cause an elevated sensation of pain from bright light. A likely reason for the glare aversion reflex is that it protects the retina from potential damage caused by looking at the sun, and therefore the reflex is an evolved behavior for all organisms with eyes that function during outdoor daylight. However, not all wavelengths of light have equal potential for damage. The blue light hazard function, which is defined in ANSI Z80.3 standard and other similar references, is a weighting function of the potential for damage caused by light as a function of its wavelength. The damage potential of an individual photon of light depends on both the energy of the photon (which is inversely proportional to its wavelength) and the absorptance spectrum of the biological tissues of the eye that the photon may interact with. A reasonable explanation for why the glare aversion reflex is stronger for short-wavelength light is that short-wavelength light has a greater hazard according to the blue-light hazard function; however the blue-light hazard function does not factor the perceived visibility of blue light. Therefore the author propose a new weighting function: the blue light hazard visibility function. The calculation of the blue light hazard visibility function is depicted in FIG. 8: herein, the curve at 801 is the relative photopic luminous efficiency function which corresponds to the perceived intensity of light as a function of wavelength, the curve at 802 is the blue light hazard function, and the curve at 803 is the blue light hazard visibility function, which is formed by computing the product 804 of the photopic luminous efficiency function with the blue-light hazard function. Whereas the blue-light hazard function has a peak weight between 430 nanometers to 440 nanometers, these wavelengths of light are actually have a relatively low visibility and therefore cannot have a strong contribution to the glare aversion reflex. The blue-light hazard visibility function incorporates the perceived visibility of these wavelengths and therefore has a peak weight between 470 nanometers to 480 nanometers.

Assuming that the glare aversion reflex is correlated with the perceived visibility of the blue light hazard, which the author believes to be a reasonable theory, then a filter that is maximally effective for reducing the perceived discomfort from glare should preferably attenuate wavelengths of light between 460 nanometers to 500 nanometers, and substantially transmit wavelengths of light less than 450 nanometers and greater than 500 nanometers.

Figure 9:
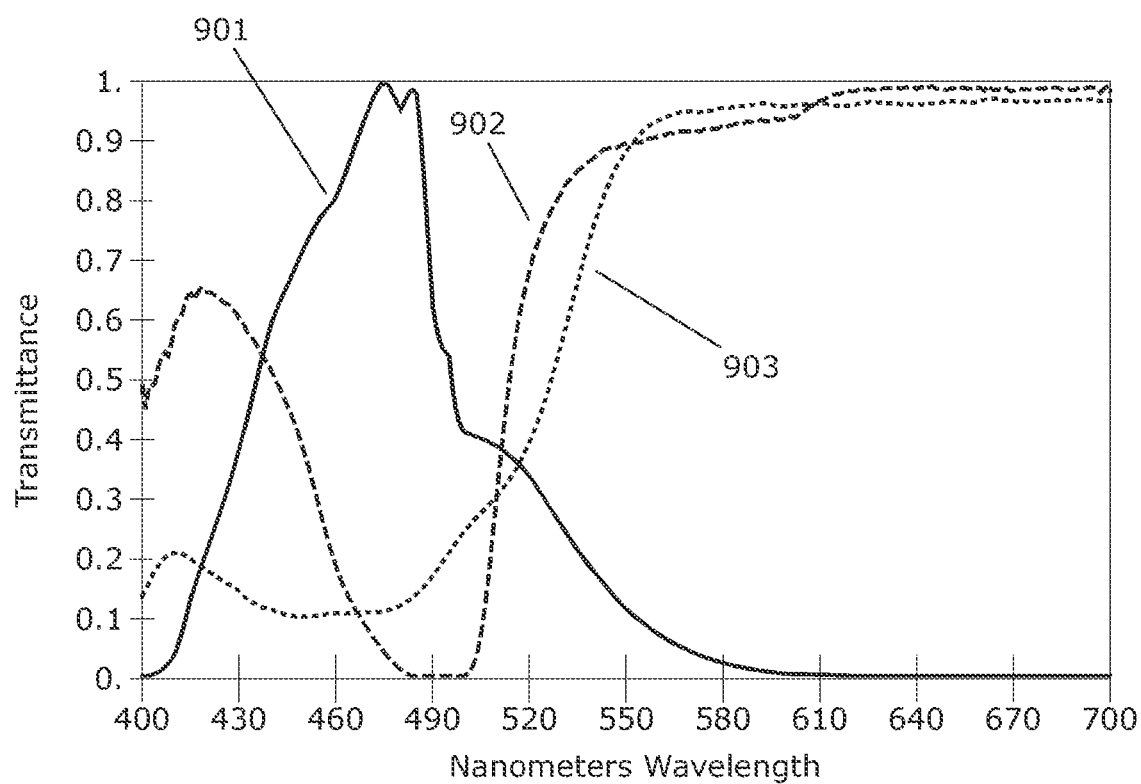
FIG. 9: Graph showing the perceived discomfort of glare weighting function as described along with FIG. 8, in comparison to the spectral transmittance of the exemplary filters as described along with FIGS. 6 and 7.

The graph of FIG. 9 depicts the transmission of the example filters (the conventional high-transmission blue-attenuating filter at 903; the improved high-transmission blue-attenuating filter at 902; and an overlay of the blue-light hazard visibility function at 901. In this graph it can be seen that both filters have some effectiveness at reducing the blue-light hazard visibility and therefore can be expected to have some effectiveness at reducing the discomfort of glare.

Figure 10:
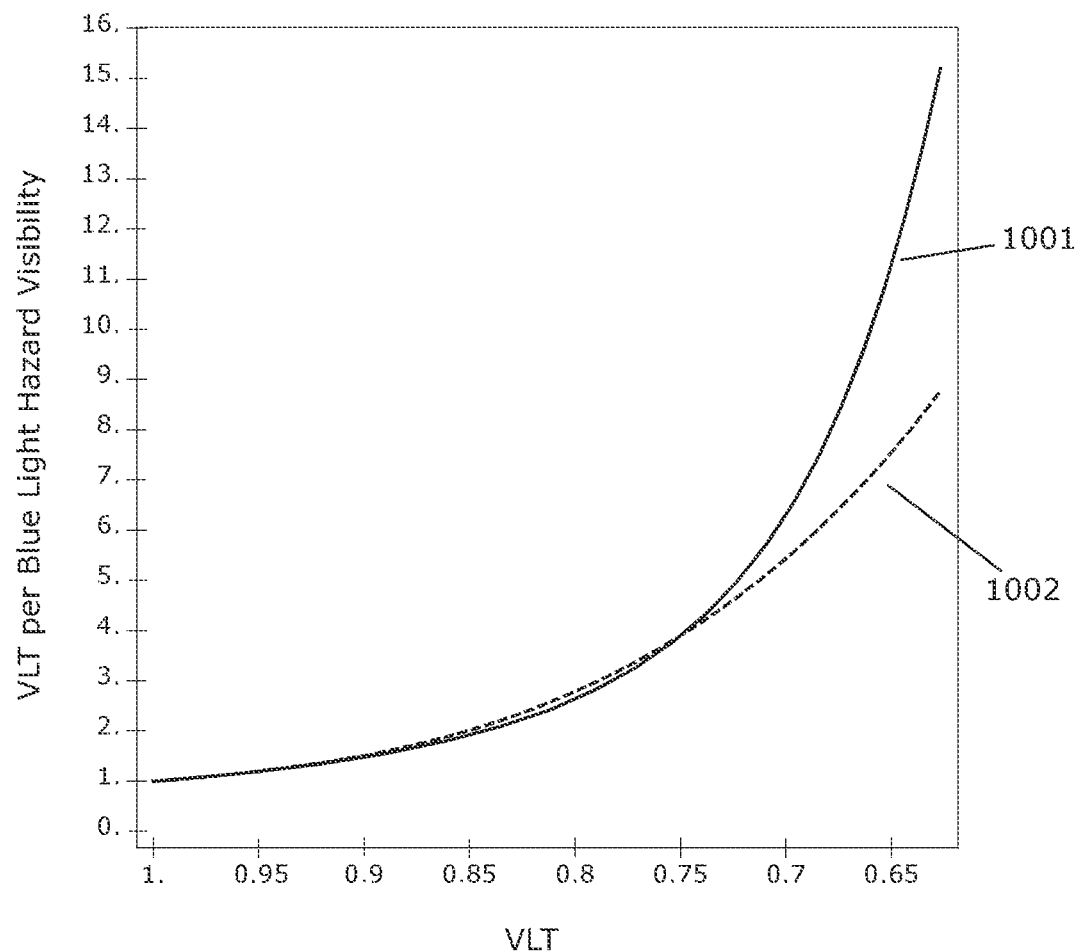
FIG. 10: Graph showing the ratio of VLT to perceived discomfort of glare, as a function of decreasing VLT, with respect to the exemplary filters as described along with FIGS. 6 and 7 comprising increasing concentrations of the organic dyes described in FIG. 5.

To better quantify the effectiveness of each filter at reducing the discomfort of glare, FIG. 10 depicts the effectiveness of the conventional blue-attenuating filter as compared to the improved (narrow-band) blue-attenuating filter, as a function of decreasing overall visual light transmission (VLT). Herein, effectiveness of a filter for reducing glare discomfort is defined as the ratio of the VLT of the filter (which is the integral of the photopic luminosity curve multiplied by the filter to be analyzed) to the filters blue light hazard visibility factor, which is the integral of the blue-light hazard visibility curve multiplied by the filter to be analyzed. The solid curve at 1001 depicts the glare discomfort effectiveness of the conventional blue-light attenuating filter, as the concentration of the broad-band blue light attenuating dye is increased from zero to a peak optical density of about 1.5. The dashed curve at 1002 depicts the glare discomfort effectiveness of the improved blue-light attenuating filter, as the concentration of the narrow-band blue light attenuating dye is increased from zero to a peak optical density of about 5.0. It can be seen by this analysis that for filter designs having a high transmission (e.g. between 75% to 100% or a VLT of 1.0 to 0.75), the conventional blue-attenuating filter and the improved blue-attenuating filter have essentially equal performance. At transmissions less than 75% the conventional blue-attenuating dye has better performance for glare reduction, however a lens with less than 75% transmission is considered a sunglass lens and cannot be reasonably described as "high transmission" for the purpose of wearing at night time or during twilight conditions. The improved blue-attenuating filter provides substantially the same glare discomfort reduction as a conventional filter, but has substantially improved color vision and is therefore a preferable embodiment for ophthalmic filters intended to reduce the discomfort of glare.

As will be shown in further detailed discussion of this disclosure, the improved high-transmission blue-attenuating filter, and related variations of this aspect, can be used to make filters for optical lenses that provide superior glare reduction when compared to conventional blue-attenuating lenses. A common feature of the embodiments herein is the use of a narrow-band dye for absorbing (attenuating) blue light with wavelengths between 450 nanometers to 500 nanometers, while substantially transmitting wavelengths of light between 400 nanometers to 450 nanometers and for wavelengths between 500 nanometers and 700 nanometers, and incorporating said narrow-band dye at a high concentration: generally having an optical density of 2.0 or greater (equivalent to a transmission of 1 percent) at a peak absorption wavelength between 460 nanometers to 500 nanometers. In some variations, the improved high-transmission blue-attenuating filter may be incorporated into eyewear for use while operating a car or airplane during twilight or night-time conditions. In some variations, said narrow-band dye may be combined with one or more other dyes to create an improved blue-attenuating filter with low transmission, such as having a VLT of about 35% or about 12% or about 3% or about 1%. These improved blue-attenuating filters with low transmission may be useful for people with visual impairments and low vision, including photophobia, extreme glare sensitivity and photophobia.

A method of using an eyewear device to improve vision and/or to reduce the discomfort from glare consists of positioning an eyewear device having an improved high-transmission blue attenuating filter (as described above) in front of the eyes of a person so that the person's field of view is substantially filtered by the spectral transmission of the ophthalmic lens. Examples of a substantial amount of coverage of the field of view include a solid angle of 10 degrees, or of 25 degrees. Preferably the eyewear device and ophthalmic lens should provide a field of view that is wide enough so that the lens can improve vision for a central region where a visual task is being performed, in addition to a surrounding region where glare sources of light may be present that are distracting and or may interfere with the performance of a the task. A glare source region within the visual field having a luminance that is significantly higher than the average surface illumination and the glare source causes an instinctive desire to look away from the region of higher luminance due to an elevated sensitivity to bright light and/or excessive luminance of the glare source. As discussed above, the properties of the improved high-transmission blue-attenuating filters act on glare sources to reduce the discomfort caused by the glare source while simultaneously minimizing undesirable side effects including reduced quality of color vision associated with blue light attenuation, and reduced luminous transmission.

Night-Time Driving Eyewear for Improving Color Discrimination

Red-green color blindness is the most prevalent type of inherited color vision deficiency. Red-green color blindness includes subtypes called protan-type (protanomaly and protanopia) and deutan-type (deuteranomaly and deuteranopia). Without loss of generality, the symptoms of both types of red-green color blindness include a reduced color discrimination along certain directions of color space generally organized along the red-to-green direction. A symptom of red-green color blindness is "color confusion" which is the phenomenon of when a person with red-green color blindness perceives a color incorrectly according to how it is seen by a person with normal color vision. The most frequently confused pair of colors are blue and purple: for example a person with red-green color blindness will often describe a blue color as purple, and a purple color as blue.

To better understand color confusions the author analyzed data from a study of approximately twenty individuals with red-green color blindness, involving having the individuals name the colors of a set of objects with a common shape and size under typical daylight conditions. Each object had a single "focal color". The focal colors are: blue, green, yellow, orange, red, purple, and pink. Focal colors are at or approximately at the centers of canonical color name regions in color space. The author found that the most frequently misidentified colors are: purple, green, and orange. The most frequently correctly identified colors are red and yellow.

In a second aspect of the author's work, survey data was collected from more than twenty people with red-green color blindness regarding their subjective experience of the color of standard intersection control traffic signals which are red (for stop), yellow (for caution or yield) and green (for go). It was found that people with mild deutan-type and protan-type red-green color blindness typically did not have issues interpreting traffic signals except under challenging situations. An example of a challenging situation includes signals that are far away (subtending a very small angle and therefore limiting information spatially), or signals that are flashing (intermittent signals and therefore limiting information temporally). Furthermore, it was noted that people with moderate to strong deutan-type or protan-type red-green color blindness typically perceived the green signal as pale green or white, but had no issues interpreting the yellow and red signal except during challenging situations as previously discussed. Only in one case did a person with strong protan-type red-green color blindness describe the red signal as appearing more like orange. Anecdotally, the author has noted in interviews that people with red-green color blindness frequently complain that interpreting traffic signals is more difficult at night, and that the correct perception of green traffic signals is the primary difficulty, whereas the perception of yellow and red traffic signals is only rarely reported as being problematic.

The increased difficulty of interpreting traffic signals at night is conventionally thought to be due to reduced visibility of contextual information such as the movement of other vehicles on the road, or the position of the illuminated light within the signal apparatus (e.g. red at the top, yellow in the middle and green at the bottom). Some inventors have proposed solutions for adding non-color related information such as symbols to traffic signals, for example having the red signal appear in the shape of a triangle and the green signal as a square. However, this solution is only useful for traffic signals at a near to moderate distance and cannot assist with the color interpretation of more distant signals. The author proposes herein a new method for improving the ability of a person with color vision deficiency to interpret the color of traffic signals and navigational indicator lights by use of an improved high-transmittance blue-attenuation filter. This method may be practiced by providing a spectacle lens or other form of optical filter (such as a shield or visor) that filters the light in such a way that the person with red-green color blindness is more likely to perceive the correct color when viewing traffic signals. To enable the practical use of such a device during twilight and night time conditions (when the difficulty with correct interpretation of such lights is most critical), the filter must also have a high transmission, generally equal to 75% or to 80%.

Conventional thinking regarding filters that correct for red-green color blindness is to provide a filter that is one of the following spectral characteristics: 1) a red filter, that broadly suppresses blue and green wavelengths of light and transmits red wavelengths of light, 2) a purple or pink filter, that broadly suppresses green wavelengths of light and transmits blue and red wavelengths of light, or 3) a narrow-band filter that attenuates yellow light (between about 560 nanometers to 590 nanometers) while substantially transmitting other wavelengths of light. The first two types of filters (red filters and purple or pink filters based on broadband light attenuation) are thought to be effective because they can cause a person with red-green color blindness to pass the Ishihara plate test. This is a fallacy of the converse and such filters are in fact, wholly ineffective at improving color vision. The third type of filter (the narrow-band filter suppressing yellow light) is generally effective for improving color discrimination in people with red-green color blindness, however it is not effective for night time use for three reasons: 1) when implemented as an absorptive filter, the dye chemistry results in undesirable absorption at wavelengths shorter than the peak absorption wavelength—generally manifesting as a side-band or gentle slope on the short wavelength side of the peak, and, because said undesirable absorption tends to occur around the wavelengths of maximum photopic sensitivity, the resulting filter is unacceptably dark for night-time use; 2) the yellow-attenuating filters do not actually improve color perception of the green traffic signals, rather, they make it worse by causing green lights to look even less saturated and more like white to the person with red-green color blindness; and 3) narrow-band yellow-attenuating filters tend to make yellow traffic signals and yellow street lights unacceptably dark (especially low pressure and high pressure sodium lamps).

In the author's view, the problem of assisting the vision of a person with red-green color blindness benefits from a technical analysis of the use situation. It is unreasonable to expect or believe that any particular optical filter is capable of correcting or compensating for the symptoms in all possible situations. However, by considering a limited set of target colors and their spectral signatures, (e.g. the traffic signals, street lights and any other colors being observed)

and the specific set of symptoms to be addressed, there is a reasonable chance to design a filter that can improve color discrimination in a specific situation. In the case of the problem of improving the color discrimination of traffic signals for a person with red-green color blindness in twilight and night-time conditions, the author has discovered that the improved blue-attenuating filter, and related variants thereof, are in fact effective for this purpose in addition to the glare-reduction benefits previously discussed.

Figure 11:
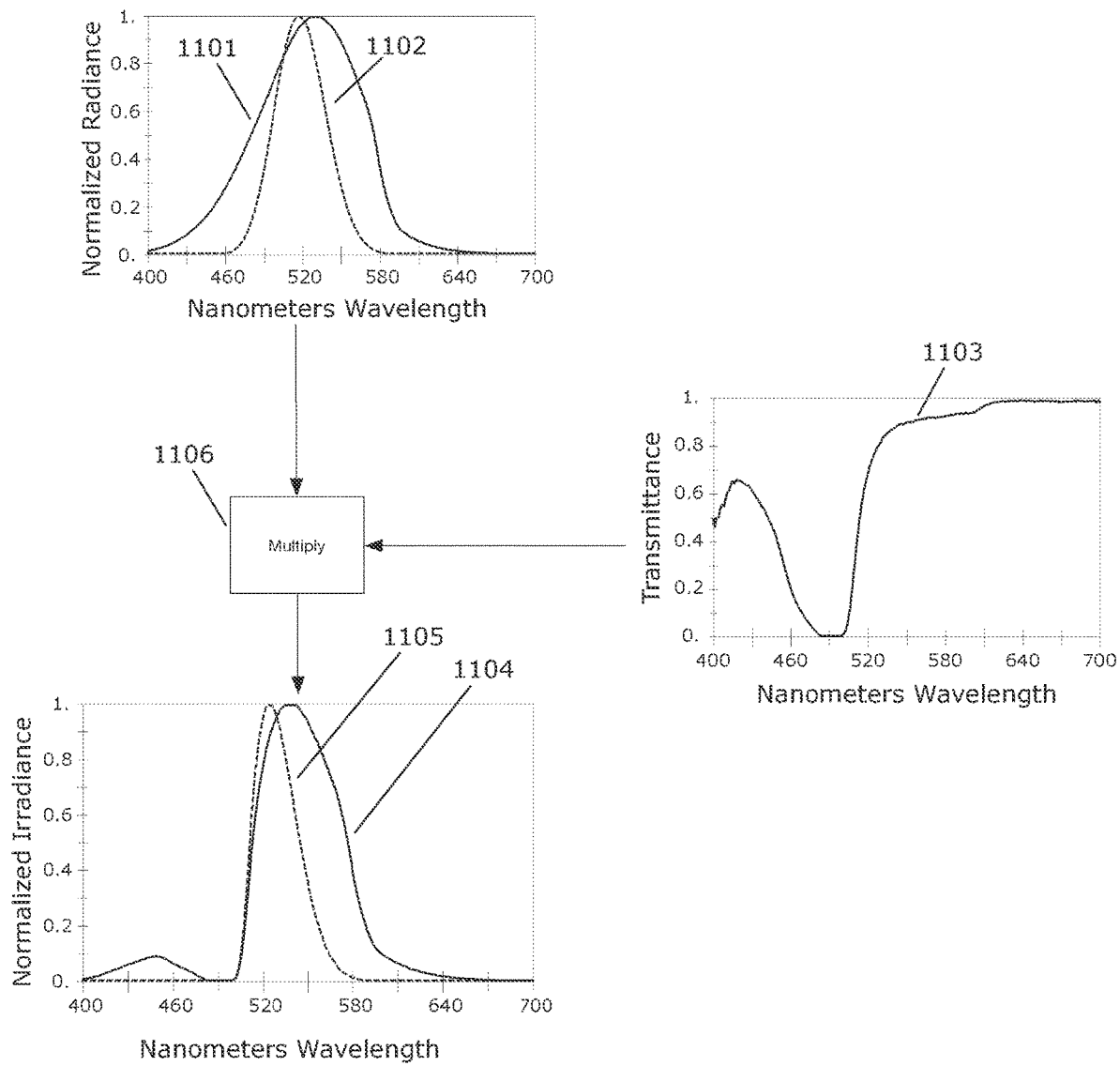
FIG. 11: Diagram showing the effect of a 460 nanometer to 510 nanometer notch filter on the spectral irradiance of conventional (incandescent) and LED-based green traffic signals.
Figure 12:
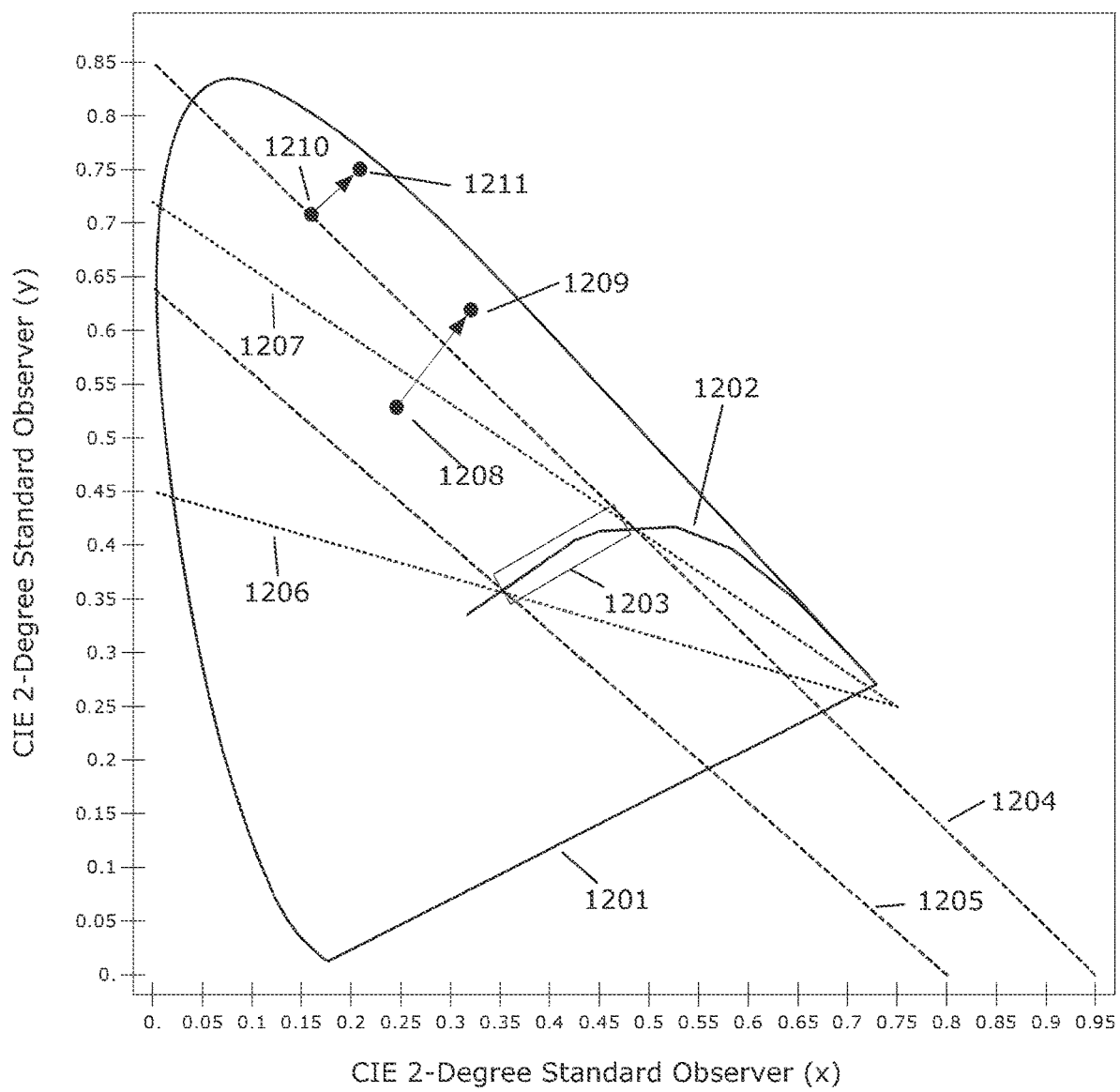
FIG. 12: Chromaticity diagram showing regions that are confused with white by persons with protanomalous and deuteranomalous color vision deficiency, and the chromaticity coordinates of conventional and LED-based green traffic signals as seen in an unfiltered reference condition, and as seen when viewed through an ophthalmic filter comprising a notch filter between 460 nanometers to 510 nanometers.

To explain the nature of this invention and how it may improve color discrimination for a person with red-green color blindness in the night-time use situation, we now discuss FIG. 11 and FIG. 12. In FIG. 11, the solid line at 1101 depicts the normalized spectral radiant flux from a green traffic signal, according to ANSI Z80.3-2015, corresponding to green traffic signal formed from the combination of an incandescent bulb and a green-glass filter. The dashed line at 1102 corresponds to the normalized spectral radiant flux from a green light emitting diode, which is typical of new and retro-fitted green traffic signals. The solid curve at 1103 corresponds to an improved narrow-band blue-attenuating filter, having a VLT of 80 percent and an optical density of greater than 3.0 at 490 nanometers. This filter is designed to be acceptably high in transmission for night-time use according to ANSI and ISO standards regarding tinted spectacle lenses. To understand how the green traffic signal is seen through this filter, the spectral radiant flux of the green signals can be multiplied by the filter, as represented by the flow chart diagram at 1106, resulting in the filtered green signals 1104 corresponding to the conventional green light traffic signal and 1105 the light-emitting diode-based green traffic signal. Whereas light wavelengths seen as green generally have a wavelength of 520 nanometers to 540 nanometers, it can be seen here that the filter substantially removes portions of the radiant light that are between 460 nanometers to 500 nanometers, which are generally regarded as blue or cyan in color. Not shown in FIG. 11 are yellow and red traffic signals, however these generally consist of radiant light having wavelengths greater than 550 nanometers and therefore are not substantially altered by transmission through the filter of interest.

To better understand and explain the effect of removing said blue and cyan light from the radiant flux of green traffic signals, FIG. 12 depicts a chromaticity diagram showing points corresponding to the color appearance of said green lights in unfiltered and filtered conditions, along with certain reference lines corresponding to the so-called "confusion lines" corresponding to deutan-type and protan-type red-green color blindness. The outer contour of the chromaticity diagram 1201 is the chromaticity locus corresponding to the color appearance of monochromatic wavelengths of light and the "purple join". The line at 1202 corresponds to the blackbody locus which are the color appearances of light from an ideal blackbody radiator as a function of temperature. A rectangular region is shown at 1203 which corresponds approximately to the section of the blackbody locus for temperatures between 2700 Kelvin to 6500 Kelvin, which is the typical range of color temperatures for white light used in residential, industrial and architectural general lighting applications (typical white light). Light having a correlated color temperature of less than 2700 Kelvin tends to have an orange-like appearance and is no longer perceived to be "white" to normal human color vision, and for color temperatures above 6500 Kelvin the light tends to appear as a shade of blue to normal human color vision. The pair of dashed lines 1205 and 1204 are lines of deutoranopic confusion lines, passing through the endpoints of the boundary region for typical white light. The region of color space between these two dashed lines correspond to colors that a deuteranopic observer would perceive as white. The point 1208 corresponds to the color appearance of the conventional green traffic signal, and the point 1210 corresponds to the color appearance of a modern LED-based green traffic signal. Based on this diagram, we can conclude that a person with deuteranopia will likely see green traffic signals (both old and new types) as being white. However, most persons with deutan-type red-green color blindness actually do have some residual red-green discrimination ability, in which case they may see the green traffic signals as a pale green. The LED-based green light has a greater distance from the typical white region, and should therefore be less likely to be confused with white. However, in the author's conversations with numerous people with color blindness, the problem of correct perception of green traffic signals is still a problem for modern LED-based signals. For persons with protan-type deficiency, the color confusions are slightly different. The dotted lines at 1206 and 1207 correspond to the protanopic confusion lines that pass through the endpoints of the typical white region, wherein lights falling between these two lines may be confused with white. In this case, we can see the conventional green light is likely to be confused with white, as the point 1208 falls between the protan confusion lines. The high-transmission narrow-band blue-attenuating filter (as previously described) removes the green-to-white confusion problem by causing the apparent color of the green lights to be shifted to new points shown at 1209 and 1211. It may be appreciated by this diagram that the new points are outside the bounding confusion lines for both deutan-type and protan-type cases of red-green color blindness.

The author has performed trial testing of eyewear containing such a filter in the format of a spectacle lens, with people of various types of red-green color blindness in night-time driving conditions, and it was reported that they could see traffic signals more accurately and at much greater distances with improved confidence. In the author's opinion, the invention is counter-intuitive because the filter would generally be considered to be a blue-yellow enhancing filter, because it removes a source of perceptual noise in the blue-yellow opponent channel, however in practice it is found the filter is useful for assisting a person with red-green color blindness to perform a specific visual task related to green lights. According to the spectral overlap theory of red-green color blindness it is not obvious that a filter that attenuates the light at 490 nanometers would have any benefit to the vision of a person with red-green color blindness, however, the specific effect on green traffic signals and experimental results clearly demonstrate the utility of the invention. A further benefit of the filter that is also non-obvious, is that the filter as described generally provides a VLT of between 75% and 80% but passes yellow and red traffic signals, indicator lights and brake lights with a transmission of 90% to 100%. Therefore, these yellow and red lights appear with a brightness of 10% to 25% greater than average, which may also contribute to an improved color perception for yellow and red signal lights. After pupil accommodation, this effectively increases the brightness of red lights by up to 25% which is especially useful to persons with protan-type red-green color blindness, who otherwise tend to see red lights with a lower intensity than seen with normal color vision or with deutan-type red-green color blindness. Given the foregoing discussion, it may be readily appreciated that the problem of improving color discrimination, for a person with red-green color blindness, of green, yellow and red traffic signals can be solved by having the person view said traffic signals through an optical filter that provides 1) a high-transmission of at least about 75%, and a narrow-band attenuation of light between about 460 nanometers to 500 nanometers, and substantially transmits light at wavelengths both below and above the attenuation band.

In light of the foregoing discussions, it may be understood that a method of improving the ability of a person to operate a motor vehicle or marine vehicle or aircraft comprises positioning an eyewear device having an ophthalmic lens with an improved high-transmission blue attenuating filter (as described above) in front of the eyes of a person so that the person is able to view the colors of traffic lights or marine navigation lights or aircraft navigation lights distant from the vehicle (e.g. at a distance of 10 feet to infinity), and thereby being able to make an improved quality of color judgements of the apparent color of said lights enabling the person to perform safe and effective operation of the vehicle, and also providing the benefit of reduced discomfort from glare sources such as from the headlights of oncoming traffic. More specifically the method is particularly useful when it is performed by a person with color vision deficiency, and more specifically when the person has a form of anomalous trichromacy such as deuteranomalous or protanomalous color vision deficiency. More preferably the eyewear device may provide a gradient lens that enables a stronger attenuation of glare from non-central regions of the lens by having a luminous transmittance between 40 percent and 60 percent in a non-central region. More preferably the lens may provide a luminous transmittance of 75 percent plus or minus 3 percent in the central region, so that the lens may be safely and effectively worn during dusk and night time conditions. More preferably the lens may provide a luminous transmittance of 80 percent plus or minus 3 percent in the central region, so that the lens may be safely and effectively worn during dusk and night time conditions. The aforementioned methods may also comprise use of devices other than spectacle lenses including but not limited to: window tints, visors mounted in the vehicle or within a helmet system, or into contact lenses, intraocular lenses or other ophthalmic or optical systems.

ipRGC-Attenuating Filter for Circadian Rhythm Improvement

A further application of blue-attenuating filters is in the inhibition of phototransduction to the intrinsically photosensitive retinal ganglion cells (the ipRGCs). The ipRGC is a class of retinal cell capable of phototransduction, and peak absorption at about 475 nanometers, but generally does not contribute to vision. It is believed that photopic stimulation of the ipRGCs inhibits the production of melatonin, which generally enhances alertness and suppresses sleepiness. During daytime hours under natural light, the ipRGCs are maximally stimulated during overhead daylight when the color of sunlight has its highest correlated color temperature (e.g. at around 6500 Kelvin). In modern life, the prevalence of digital screens (computers, phones, televisions) and the widespread use of bright indoor lighting during the evening hours, may cause the ipRGC to be stimulated during evening hours, which could contribute to poor quality of sleep and insomnia.

Figure 13:
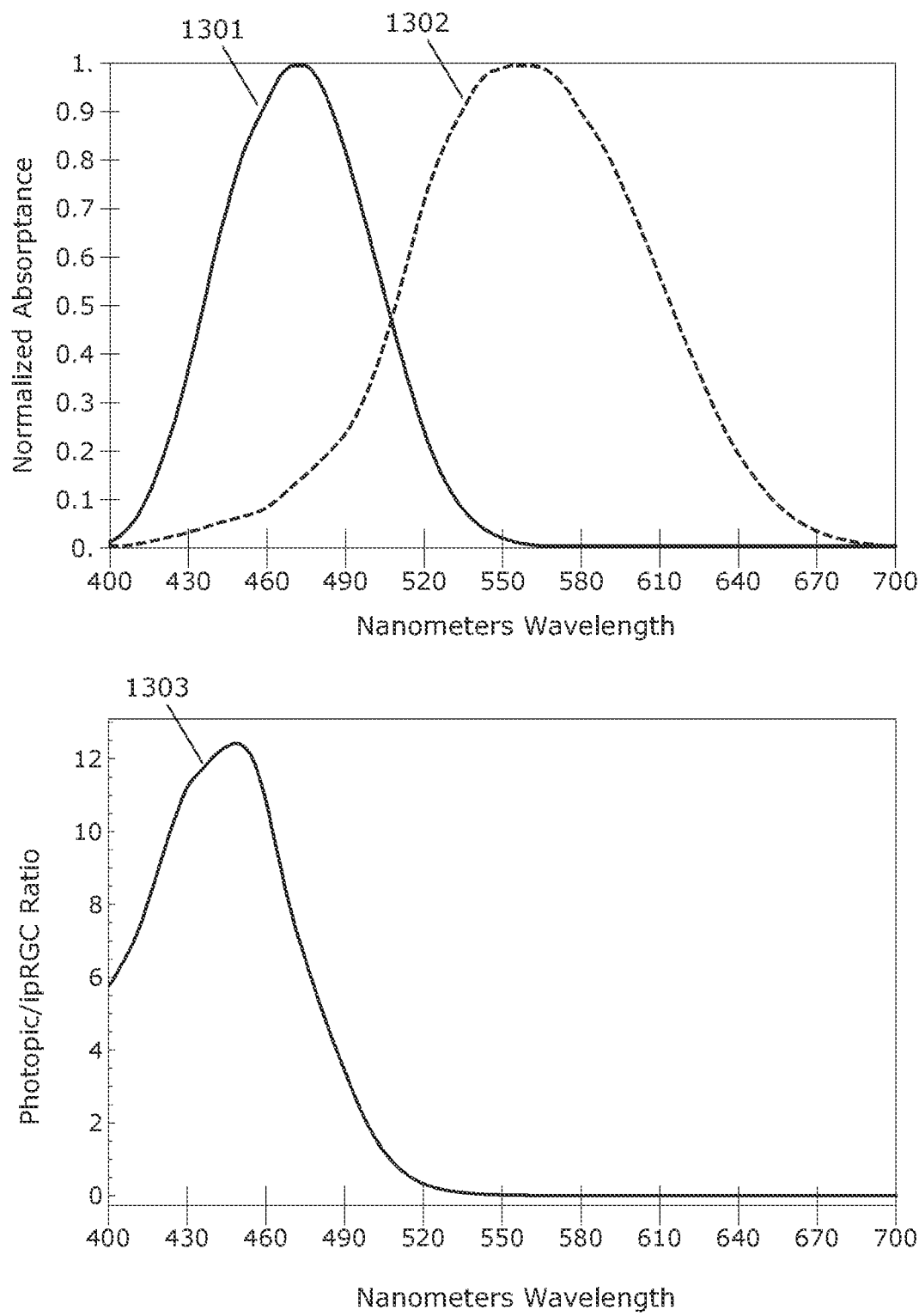
FIG. 13: Graph showing the normalized sensitivity function of the intrinsically photosensitive retinal ganglion cells and the photopic luminous efficiency function; and the ratio of the two sensitivity functions.

The use of orange lenses has been popularized by "biohackers" that seek to modify their physiological processes using optical filters such as the Uvex Orange-SCT as discussed previously. These lenses are undoubtedly effective at reducing the stimulation of the ipRGC, but have undesirable side effects including a poor quality of color perception and a low level of luminous transmittance, which are contraindicated for long term therapeutic use of the devices. Whereas long term and consistent use is necessary to gain any significant health benefits, an improved optical filter design that addresses these shortcomings is useful. The author has observed that this improvement may be realized by providing a filter based upon a narrow-band blue-attenuating dye that is tuned to absorb primarily where the ipRGC is at its most sensitive. The graphs of FIG. 13 explain why this improvement is preferable to a broad-band orange dye: the curve at 1301 shows the normalized absorptance of the ipRGC, and the curve at 1302 shows the photopic luminous efficiency function, which is approximately equivalent to the combined normalized absorptance of the three classes of retinal cone cells (S, M and L). To maximally suppress stimulation of the ipRGC, a filter should maximize the ratio of photopic to ipRGC absorptance, which is shown by the curve at 1303. Herein, it can be seen that the most effective wavelength to absorb is at about 450 nanometers, with the efficacy decreasing at both shorter and longer wavelengths. More preferably, in order to perform such filtering while also preserving and/or enhancing color perception of blue colors, an improved blue-light attenuating filter is directed toward primarily attenuating the wavelengths on the longer side of the curve, specifically those between 460 nanometers to 500 nanometers, thus enabling the filter to be reasonably effective at reducing the stimulation of the ipRGC without causing a poor quality of color vision that would result if a substantial amount of blue light between 430 nanometers to 450 nanometers were to be absorbed. The filter may be incorporated into eyewear, which is worn from sunset hours until a person goes to sleep. Alternatively or in addition, the filter may be incorporated into lamps that are used in the evening hours, including residential fixtures, desk lamps, task lamps and night lights.

Figure 14:
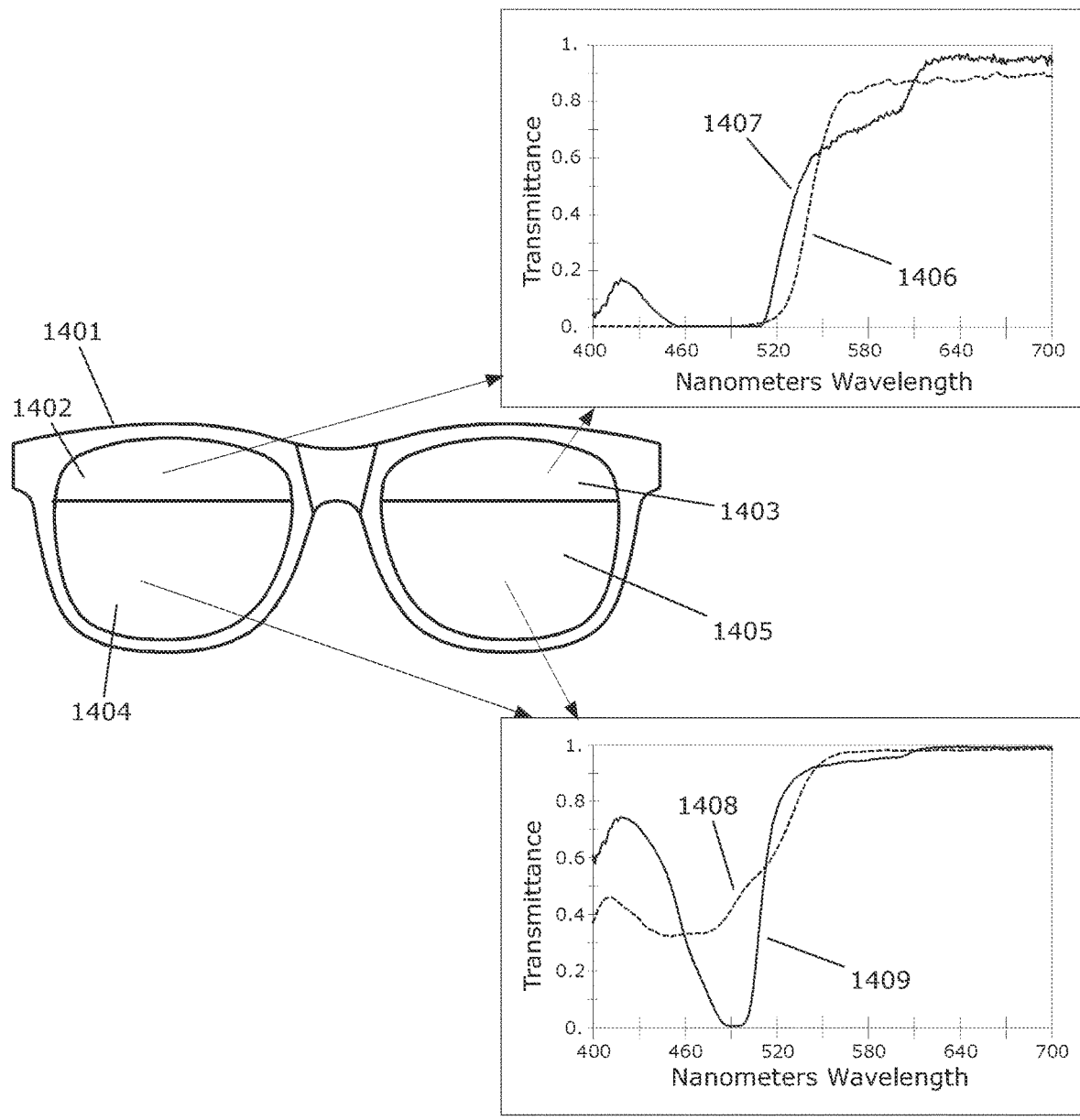
FIG. 14: Diagram depicting eyewear having a gradient density of a blue-absorbing dye wherein the density in the upper region of the lens is greater than the density in the lower region of the lens.

The author has also realized a further improvement to this concept which is relevant to the method of improving melatonin production by wearing a suitable spectacle lens during evening hours, wherein a gradient or segmented lens is provided having an upper region that is more densely tinted than the lower region. FIG. 14 explains this idea in detail: herein, 1401 depicts a pair of spectacle lenses mounted in a frame; the upper region of the lens at 1402 has a medium to low transmittance depicted by curve 1406 (for a conventional orange dye) or 1407 (for a more preferable narrow-band blue-attenuating dye), wherein the transmittance of the lens in this region may be as low as about 40 percent. Meanwhile, the lower region of the lens 1404 has a transmittance with the dye but at a substantially lower density, for example between 75 percent and 80 percent. The transmittance of the lower region of the lens is shown by the curves 1408 (for a conventional orange dye) or 1409 (for a more preferable narrow-band blue-attenuating dye). Preferably the lens should have a smooth transition of dye density between the upper and lower regions, so that the transition is not annoying to the person wearing the glasses, however it may also be a sharp transition and still provide the same effect. The benefits of the gradient or spatial variation between the top and bottom regions of the lens are multiple: 1) according to recent research, it is believed that the ipRGC cells disposed in the inferior segment (lower portion) of the retina have a greater contribution to the melatonin-suppression circuit—due to the reversal of the lens projection this region corresponds to light arriving from above, essentially from the sky; 2) in indoor evening conditions the primary sources of indoor lighting are from the ceiling, 3) by providing a greater VLT of the lens in the lower section, indoor mobility is improved as the need to see the floor, trip hazards, stairs and other features, is improved. Thus, the gradient or spatially variable lens is the preferred format for such a spectacle lens or other ophthalmic system.

In light of the foregoing discussions, it may be understood that a method of improving the ability of a person to have high quality sleep while also enabling them to perform tasks such as using a computer and/or performing tasks under artificial illumination comprises waiting until a time period approximately two hours prior to the person's anticipated bed time, and then positioning an eyewear device having an ophthalmic lens with an improved high-transmission blue attenuating filter (as described above) in front of the eyes of a person so that the field of view of the person is substantially transformed by the spectral filter, and then the person wearing the eyewear device as positioned for a period of at least two hours or until the person goes to sleep. More preferably the method also comprises the person performing visual tasks involving a computer, mobile phone or tablet or watching television while wearing the eyewear device. When the method is performed consistently as described the person should experience a rapid and consistent onset of sleepiness in the two hour period prior to their intended time of sleep, which is not disrupted by their engagement with other routine activities that are common in modern life.

Blue-Attenuation Filters with Color Vision Enhancement

Figure 3:
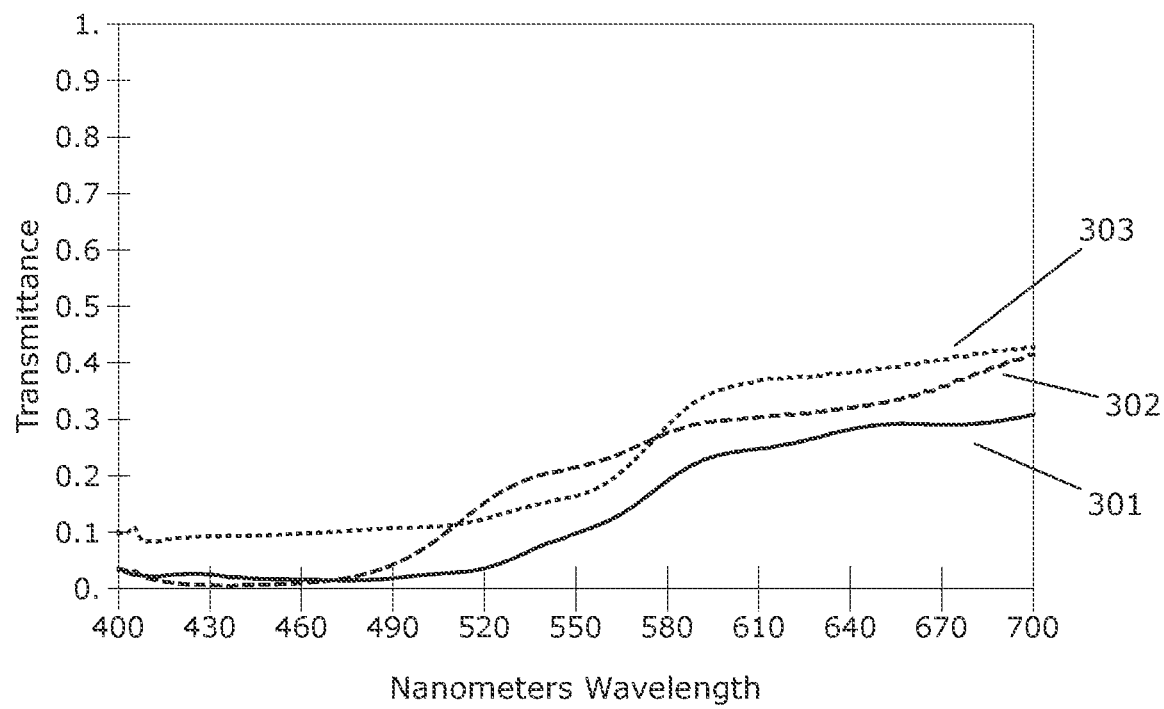
FIG. 3: Graphs of the spectral transmittance of various ophthalmic filters known in the prior art for providing glare attenuation and enhancement of vision while driving during daylight conditions.

The foregoing description of this specification provide for filters having the improved blue-light attenuation at high levels of luminous transmittance, generally being characterized by a luminous transmittance between 60 percent to 85 percent, which are also called Category 1 or Category 0 filters according to ANSI Z80.3 standard and similar international standards. Such filters are generally useful under moderate to low light levels including indoors under artificial illumination typical of residential and commercial spaces, for example situations having an average surface illumination between 101 to 1000 lux, as well as outdoors under twilight (dusk or dawn) and night time conditions which typically have an average surface illumination between 0.0001 lux to 100 lux. For situations where a higher level of illumination is present (for example greater than 1001 lux), or the person using the filter has an elevated sensitivity to glare (which is sometimes called photophobia in extreme cases), then it is useful to create filters characterized by a lower level of luminosity, for example between 18% to 40% (sunglass Category 2), or between 8 percent to 17 percent (sunglass Category 3) or between 3 percent and 7 percent (sunglass Category 4). Means for lowering the overall luminous transmittance of a filter may include adding a component with broad brand absorption, such as a polarizing filter, or a photochromic dye, or a reflective mirror coating such as a silver mirror. More preferably, the reduction in luminosity may be performed by adding a selective yellow-light attenuating filter in combination with the blue-light attenuating filter, whereas the yellow-light attenuating filter will improve the function of the lens by creating a color enhancement effect that causes the apparent color of red and green colors to increase in purity and apparent brightness relative to the average brightness of surfaces within a typical visual scene. The author has found that this color enhancement effect is enjoyed and preferred by patients who suffer from various low vision diseases, and is also preferred by persons with color vision deficiency (color blindness) and also by persons with normal color vision. Low vision is defined as an eye disease causing a best-corrected visual acuity of 20/70 or poorer in the better-seeing eye that cannot be further corrected through an ordinary refractive lens (i.e., a clear lens that alters the focus of the eye). Low vision deficiencies may include blurring of the scene that reduces the ability to see objects, markings and indicator lights that are critical for navigation and/or performing a task, an ability that is broadly called functional vision by low vision optometrists. Persons with low vision often experience elevated sensitivity to glare and benefit from the improved blue-attenuating high transmission filters as described herein. For persons with low vision who have a high sensitivity to glare, or for persons with a somewhat elevated sensitivity to glare but require functional vision under bright (greater than 1001 lux average surface illumination) lighting conditions, then a darker lens is beneficial, such as a Category 2 or Category 3 or Category 4 sunglass filter. In these cases the incorporation of a color-enhancement capability to the filter design further improves its utility and is a preferable eyewear device compared to the lenses currently available on the market (for example as described along with FIG. 3 and FIG. 4). The graphs of FIG. 1 display a range of embodiments combining the improved blue-light attenuation filters with a yellow-light attenuation filter to create a family of embodiments that may be beneficially used to improve overall vision and reduce the discomfort of glare over a broad range of lighting conditions. The solid line at FIG. 1, 101, shows the spectral transmission of a high-transmission improved blue attenuation filter. The dashed line at 102 depicts the spectral transmission of a Category 2 filter characterized by a luminous transmittance of about 35 percent. The dotted line depicts the spectral transmittance of a Category 3 filter characterized by a luminous transmittance of about 12 percent. The solid line at 105 depicts the spectral transmission of a Category 4 filter characterized by a luminous transmittance of about 3 percent. The Category 4 example is particularly useful for persons who suffer from photophobia or extreme glare sensitivity.

Figure 4:
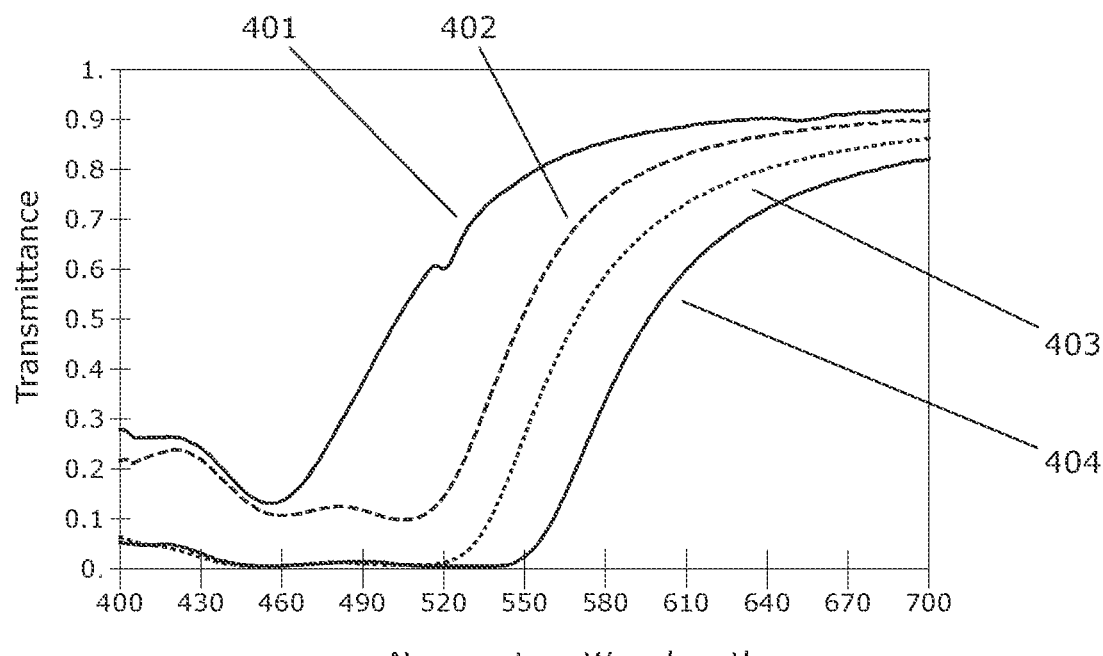
FIG. 4: Graphs of the spectral transmittance of various ophthalmic filters known in the prior art for providing glare attenuation and enhancement of vision to persons with low vision disorders.
Figure 4:
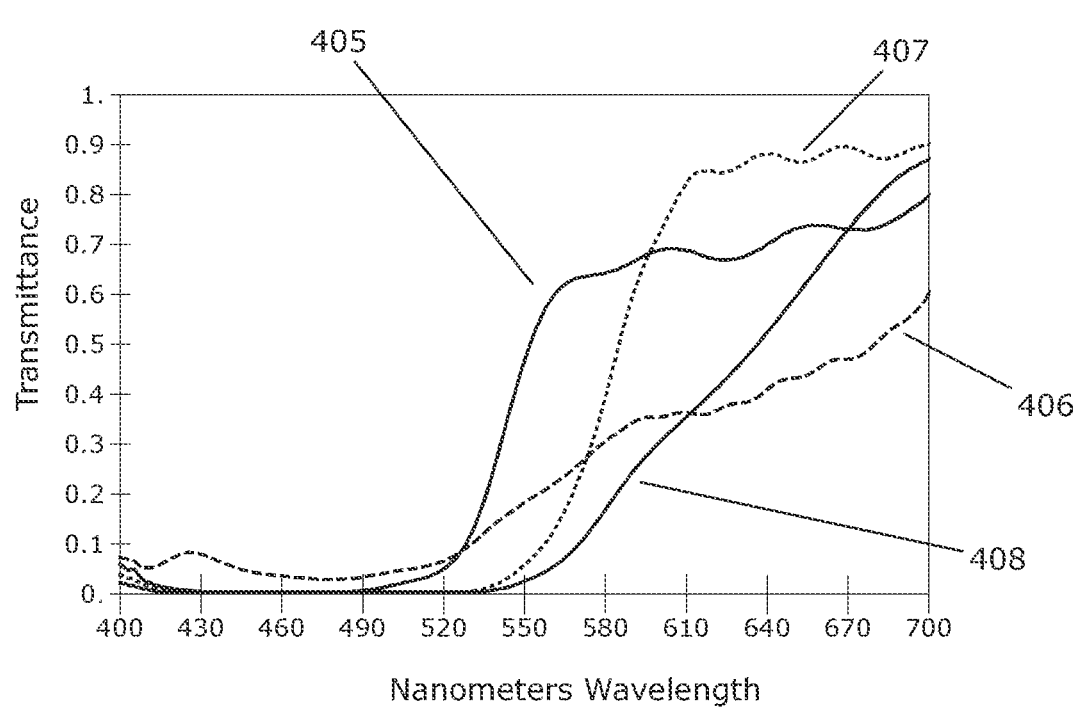
Figure 17:
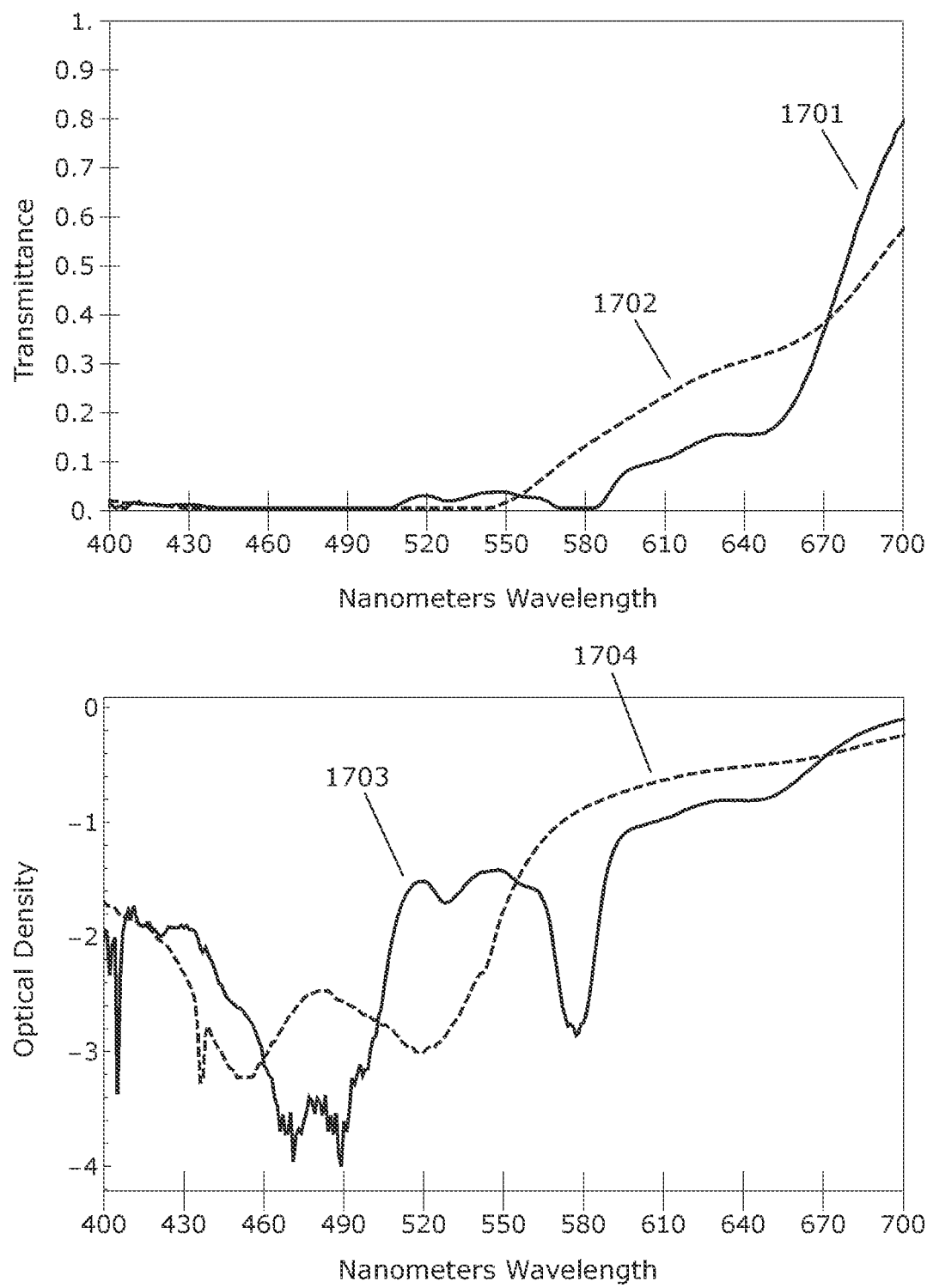
FIG. 17: Graphs of the spectral transmittance of two optical filters both providing blue-attenuation functions, in linear units of transmittance and log units of optical density.

The improved blue-attenuating and color vision enhancing filters as shown in FIG. 1 differ from those filters of the prior art for use as low vision assistive eyewear, as shown in FIG. 4. Specifically, at high transmission the improved filters (FIG. 1 at 101 and 102) use selective filtering of longer wavelength blue (between about 460 nanometers to 500 nanometers) which is preferable to the broad-band attenuation of blue light from 400 nanometers to 500 nanometers as shown in FIG. 4 at 401 and 402. Furthermore, in low transmission variants the improved filters, for example as shown by FIG. 1 at 104 and 105, combine the blue-light attenuation with a narrow-band yellow-light attenuation that blocks wavelengths of light between about 560 nanometers to 600 nanometers, which provides improved red-green color discrimination. For the low-transmission filters, to better understand the differences in transmission spectrum in particular over the blue region of the spectrum from 400 nanometers to 500 nanometers, it is necessary to examine the filter properties on a logarithmic (optical density) scale. Referring to FIG. 17, the solid line at 1701 corresponds to one the transmission spectrum of the low transmission variants of the improved blue-attenuating filter, having a VLT of about 3 percent. The dashed line at 1702 corresponds to a conventional blue-light cut-off filter. The respective optical density spectrum of these two filters is shown by the solid line 1703 for the improved filter and the dashed line 1704 for the conventional filter. By observing the optical density spectrum it is apparent that the improved filter provides a significantly greater amount of attenuation of light between 460 nanometers to 500 nanometers, where it provides an optical density of greater than 3.0, while the conventional filter actually has a region of increased blue transmission over this range. In fact the conventional filter has its greatest attenuation at 450 nanometers and at 520 nanometers, which correspond to the wavelengths of peak sensitivity for the S-cone and M-cone—such attenuation will necessarily reduce the quality of color vision substantially. Meanwhile, the improved filter provides a greater transmission of blue light between 420 nanometers to 450 nanometers, and from 510 nanometers to 550 nanometers, which enable better color vision. Furthermore, the improved filter provides a narrow-band attenuation or "notch" located at around 580 nanometers, which provides an improved red-green color discrimination which is also beneficial and preferable for use by persons with low vision and other visual impairments that cause varying degrees of color vision deficiency.

The teachings of the present disclosure are generally sufficient to understand the overall characteristics of the foregoing filters in both high-transmission and low-transmission variants. With respect to the embodiments with a low luminous transmittance (i.e. those characterized by a luminous transmittance between about 3 percent to about 40 percent), these filters are characterized by having a mean spectral transmittance between 460 nanometers and 500 nanometers less than 1 percent, and a mean transmittance of the lens between 520 nanometers and 550 nanometers greater than the luminous transmittance, and the transmittance between 600 nanometers and 650 nanometers is greater than 10%; and the mean transmittance of the filter between 400 nanometers and 450 nanometers at least 5 times greater than the mean transmittance of the filter between 460 nanometers and 500 nanometers, and the mean transmittance of the filter between 560 nanometers and 590 nanometers at least two times greater than the mean spectral transmittance between 460 nanometers and 500 nanometers. Any filter that satisfies these general characteristics may be described as an improved low transmittance blue attenuating filter that is substantially consistent with the present invention, however these limitations are intended to limit by way of example and are not necessarily an absolute requirement to make and use the invention in a similar but essentially equivalent form.

General guidance to consumers regarding the suitability of sunglass filters as they relate to lighting conditions exists such as that Category 0 filters may be used at night, Category 1 filters may be used in overcast conditions, Category 2 filters may be used in partial sun conditions, Category 3 filters may be used in bright sun conditions, and Category 4 filters may be used in extreme sun exposure conditions such as on a snow field at high elevation. The author is not aware of any such guidance or marketing materials that provide guidance or a method of lens selection that relates simultaneously to the lighting conditions and to the number of spectral notches of the filter (for example, one, or two notches) and the relative intensity or optical density of notches and the overall luminous transmittance of the filter, wherein said guidance or method may be used to select an optimal filter to improve vision for a person. As a result of the author's experience and in testing of filters typical of the embodiments of the present invention, a method of filter selection and filter use has been created wherein the method comprises selecting according to the following criteria an eyewear device comprising an ophthalmic lens for viewing a visual scene having an average surface illumination: if the average surface illumination is between 0.0001 and 100 lux, the luminous transmittance of the lens is between 60% and 85%, the maximum transmittance of the lens between 460 nanometers to 510 nanometers is less than 50 percent of the luminous transmittance of the filter, the minimum transmittance of the lens between 550 nanometers and 700 nanometers is greater than 60 percent, and the mean transmittance of the filter between 400 nanometers and 450 nanometers is at least 4 times greater than the mean transmittance of the filter between 460 nanometers and 500 nanometers; if the average surface illumination is between 101 and 1000 lux, the luminous transmittance of the lens is between 8% and 40%, the maximum transmittance of the lens between 460 nanometers to 510 nanometers is less than 5 percent, the transmittance of the lens between 520 nanometers and 540 nanometers is greater than the luminous transmittance of the lens, the transmittance of the lens between 600 nanometers and 700 nanometers is greater than the luminous transmittance of the lens, and the mean transmittance of the filter between 400 nanometers and 450 nanometers is at least 4 times greater than the mean transmittance of the filter between 460 nanometers and 500 nanometers; if the average surface illuminance is greater than 1001 lux, the luminous transmittance of the lens is between 1% and 7%, the maximum transmittance of the lens between 460 nanometers to 510 nanometers is less than 1 percent, the transmittance of the lens between 520 nanometers and 550 nanometers is greater than the luminous transmittance of the lens, the transmittance of the lens between 600 nanometers and 650 nanometers is greater than 10%, and the mean transmittance of the filter between 400 nanometers and 450 nanometers is at least 4 times greater than the mean transmittance of the filter between 460 nanometers and 500 nanometers; wherein, in the foregoing method the luminous transmittance of the lens, the spectral transmittance of the lens and the mean transmittance of the lens are defined according to measurement methods for characterizing the spectral properties of spectacle lenses as defined by American National Standards Institute Z80.3-2015; the luminous transmittance of the optical filter is defined as the weighted photopic transmittance of CIE Standard Illuminant D65 according to the CIE 1931 2-degree Standard Observer (or other suitable standard of measurement as appropriate to the type of eyewear device and lens), the minimum spectral transmittance over a range of wavelengths is the lowest spectral transmittance within the range of wavelengths; the maximum spectral transmittance over a range of wavelengths is the highest spectral transmittance within the range of wavelengths; and the mean spectral transmittance over a range of wavelengths is the average spectral transmittance over the range of wavelengths. The foregoing method may be more specifically narrowed by various combinations of lighting conditions and filters that may include one or more of any of Category 0 or Category 1 filters having only one notch filter (a blue-attenuating notch), and/or one or more of any of Category 2 or Category 3 or Category 4 filter having two spectral notches consisting of a blue-attenuating notch and a yellow-attenuating notch substantially characterized by the spectral properties described above.

More preferably the method is practiced by positioning the selected eyewear device over the eyes of a person so that the person's field of view is substantially filtered by the spectral transmission of the ophthalmic lens. More preferably the eyewear device comprises a wrap-around frame or side shields to limit the amount of stray light that may reach the eye from the peripheral vision.

Treatment of Cone-Dystrophy Disease

The retinal rod cells experience bleaching during photopic vision conditions, which suppresses their contribution to vision. Retinal cone cells recover from bleaching at an estimated rate of ten times faster than retinal rod cells. Recent advances in the understanding of dark adaptation and photopigment regeneration kinetics suggest that the cone cells and rod cells rely upon different cellular mechanisms for regeneration. The process of phototransduction in the rod cells is supported by the biochemistry of the retinal pigment epithelium (RPE). Recent findings suggest that the vision conditions of retinitis pigmentosa (RP) may be caused by accumulation of the chemical byproducts of rod phototransduction in the RPE, for example as described in the article "Recent advances in dark adaptation" appearing in the International Journal of Ophthalmology 2018; 8(6); pp. 1245-1252. A low vision specialist may recommend use of eyewear with a short wavelength cutoff filter as a vision aid for a patient with RP—for example filtering between 95% to 100% of light having a wavelength between 400 nanometers to 550 nanometers or greater, for example the filters as shown in FIG. 4 at 403, 404, 407 and 408. In light of the understanding regarding the role of rod bleaching in the vision of persons with RP, it seems reasonable to believe that these filters are effective at reducing the intensity of rod bleaching and may provide some improved quality of vision to a person with RP. More generally, filters that reducing the intensity of rod bleaching may be beneficial to other low vision-causing diseases, as such a filter could reduce the stresses caused by rod bleaching. Furthermore, the author speculates that consistent use of anti-rod-bleaching during early stages of RP could slow the progression of the disease.

Another low vision eye condition that is affected by rod bleaching during well-lit conditions is achromatopsia. Achromatopsia is a rare genetic condition in which a person's eye has no cone cells, or no functioning cone cells, but does have functional rod vision. A person with achromatopsia is able to see during daylight conditions by wearing certain dark red filters that reduce the transmission to the rod cells to levels that are sufficiently low such that the regeneration kinetics of the rod cells can act quickly enough to provide functional vision. In theory achromatopsia is a form of total color blindness, however some cases of achromatopsia, called incomplete achromatopsia, are characterized by some amount of functional cone vision, in which case the person may benefit from using an optical filter that supports functional mesopic vision during daylight conditions.

The problem with using cut-off filters to reduce rod bleaching is that these filters provide a poor quality of color vision. Retinitis pigmentosa, and other cone dystrophy diseases, is a progressive disease that take many years to develop. In the early stages the person generally has normal color vision, and over time a general color vision deficiency develops until eventually a total color blindness may occur. As discussed previously, filters that provide a poor quality of color vision are annoying to use, and limit the adoption rate of the eyewear. Therefore, to the extent that anti-rod-bleaching filters may be effective for slowing the progression of RP, broad-band cut-off filters are not optimal for this purpose because they will not provide a good quality of color vision. In the case of a low vision disorder such as incomplete achromatopsia, the existence of residual cone function may benefit from an improved filter that can support functional mesopic vision in combination with improved color vision. As will be discussed and shown below, improved narrow-band blue attenuation filters are effective for anti-rod-bleaching and can be produced in both high-transmission and low-transmission variations to support use of such filters over a wide range of lighting conditions.

Figure 15:
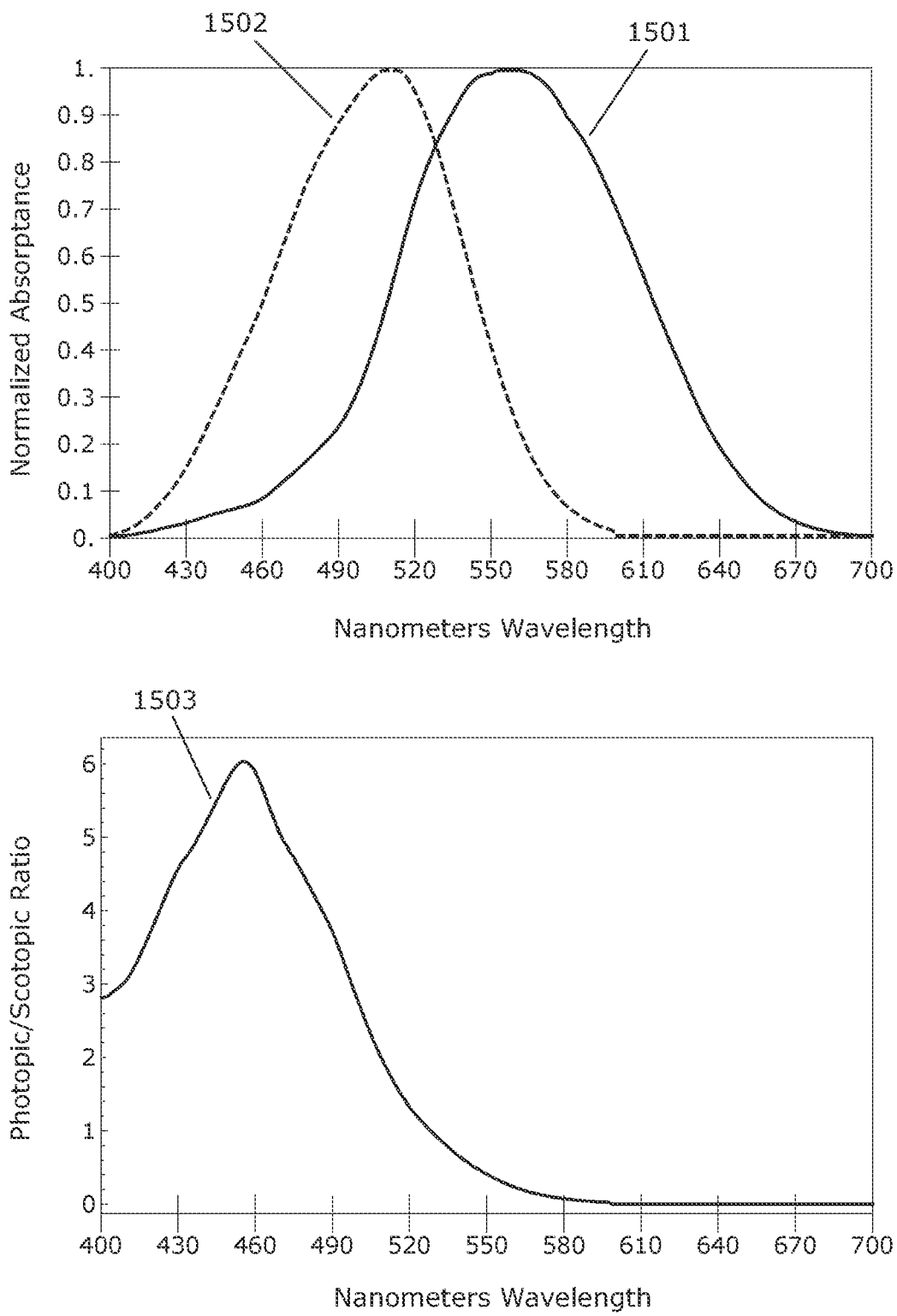
FIG. 15: Graph showing the normalized sensitivity function of the rod cells (also called the scotopic efficiency function) and the photopic luminous efficiency function; and the ratio of the two sensitivity functions.

The effectiveness of a filter for inhibiting stimulation of the rods can be understood by analyzing the ratio of the photopic transmittance of the filter (i.e. the VLT or the percentage of light transmitted by the filter weighted by the photopic luminous efficiency function) to its scotopic transmittance (i.e. the percentage of light transmitted by the filter weighted by the scotopic efficiency function which is equivalent to the rod absorption spectrum). By computing the ratio of photopic to scotopic efficiency as a function of wavelength, it is apparent that it is preferable to attenuate certain wavelengths of blue light to maximize such effectiveness. FIG. 15 at 1501 depicts the photopic efficiency function, which is a normalized weighted sum of the S-, M- and L-cone absorptances. The dashed line at 1502 corresponds to the scotopic efficiency function which is the same as the normalized spectral absorptance of the rod cells. The ratio of the photopic to scotopic efficiencies is plotted by the solid line at 1503. Herein it can be seen that it is preferable to filter wavelengths between 400 nanometers to 550 nanometers to inhibit rod stimulation, however the most effective and most preferable wavelengths to attenuate are between 420 nanometers and 490 nanometers. More preferably, attenuation of the wavelengths of light between 460 nanometers and 520 nanometers should be filtered to provide a filter with better color vision, as such a filter would inhibit rod stimulation while also providing a good visibility of blue light to the S-cone and of green light to the M-cones. If the filter is intended for use during low light conditions and during night time conditions, a high-transmission filter is ideal such as that shown in FIG. 1 at 101, whereas such filters have a VLT greater than 50 percent and up to 80 percent, which is a range of VLT generally considered a "cosmetic tint" of either category 0 or category 1 according to the ANSI Z80.3 nomenclature.

To test the efficacy of these improved blue-attenuating filters for improving the vision of a person with retinitis pigmentosa, the author worked with a test subject who had an advanced case of retinitis pigmentosa. The test subject was provided with a set of three eyewear wherein the lenses of the eyewear had the transmission spectrum as shown in FIG. 1 at 101 (category 0), 103 (category 3) and 104 (category 4). The test subject was allowed to use the eyewear for at least two weeks and then was interviewed by the author regarding his experience: the category 0 filter was found to be most effective during the early hours of the day, and under indoor lighting conditions. The subject also preferred this filter because it does not look like a dark sunglass and enabled other people to see his eyes while wearing the eyewear. The subject reported that use of the category 0 filter delayed the onset of blinding "white-out", which the author speculates is caused by the accumulation of rod bleaching products in the RPE as discussed previously. As the day progressed and white-out became more of an issue, or when going outside, he would switch to the category 3 filters, for example he could read his handwriting on a piece of paper written with a thick black marker, and could perceive outlines of people in motion around him. The category 3 filter was found to be effective during indoor well-lit lighting conditions. When going outside or riding in a car, the subject wore the category 4 filter and reported that the filter enabled him to better see certain lights and markers such as crosswalk signs and stripes painted on the road. While this experiment was limited to just 3 filters having category 0, 3 and 4, the author believes it is reasonable to conclude that category 1 and category 2 filters could also be effective for improving the vision of a person with retinitis pigmentosa when used in appropriate lighting conditions.

Figure 18:
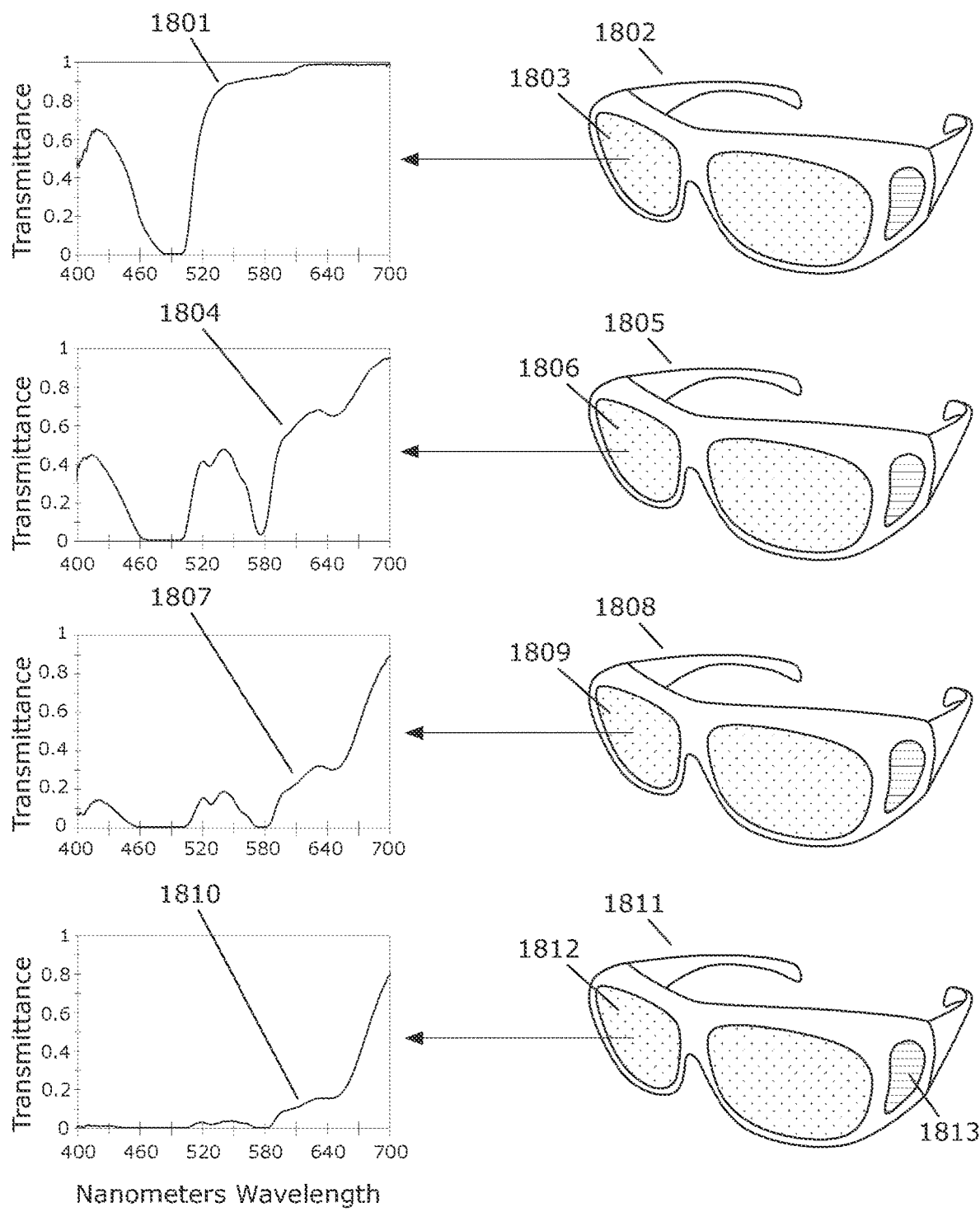
FIG. 18: Depiction of a collection of eyewear comprising blue-attenuation filters.

The foregoing discussion gives rise to a novel and inventive method of providing a treatment to a person with a progressive cone dystrophy disease comprising a) positioning an eyewear device comprising the ophthalmic lens having an improved blue-light attenuation typical of any of those given along with description of FIG. 1 or of FIG. 18, over the eyes of the person so that a substantial portion of their field of view is transformed by the spectral filter, b) maintaining the eyewear device in position for a substantial portion of the person's daily waking hours; and c) repeating steps a) and b) on a substantially daily basis over a period of at least one year. More preferably the person uses two or more such devices, a first device having a high luminous transmittance and using the high-transmittance device for indoor lighting conditions, and for outdoor lighting conditions at dusk or at night, and a second device having a low luminous transmittance and using the low-transmittance device for outdoor lighting conditions. More preferably the low-transmittance device has a visible luminous transmittance of less than 18 percent (Category 3 filter), or of less than 7 percent (Category 4 filter).

Method of Fitting and Dispensing Eyewear Devices for Patients with Vision Impairment Ambient lighting conditions vary widely depending on context, including high brightness lighting from direct sunlight, medium intensity lighting in many indoor workspaces and retail stores, low light conditions in residential lighting and at twilight conditions, and very low lighting during night time conditions. In addition, the transparency of the eye of a person may vary whereas the lens darkens and yellows with age, people with untreated cataracts and age-related eye conditions may have an ophthalmic system with an overall lower light-gathering and lower than normal light sensitivity. Furthermore, the needs of persons who experience elevated glare sensitivity range from mild sensitivity to extreme photophobia. Due to these variances, it is often necessary for a person to use multiple eyewear devices with different overall density.

In the practice of low vision optometry, it is common practice to test multiple lenses with a patient in order to find which lens is most preferred by the patient to improve their vision. Some vendors supply kits which may comprise multiple pairs of eyewear or sets of lenses in trial lens holders, with the number of different lens choices ranging between about 4 items up to 12 items or more. A general problem with the fitting kits of the prior art is that the lens density (darkness) and color (e.g. brown, blue, green, etc) do not vary in a consistent manner. For example a dark green lens may be provided, and a light yellow lens may be provided, but a light green lens may not be provided. The author has conceived an improved fitting kit that comprises four lens variations, which are designed to vary across a systematically selected range of lens density, and all being derived from a common color family. The improved fitting kit is described along with FIG. 18. Herein, a first eyewear device 1802 comprises lenses 1803 having the transmission spectrum shown at the curve 1801. The lenses have a VLT of 80 percent and is considered a category zero or category 1 lens according to the ANSI Z80.3-2015 nomenclature. The lens color appears to be a light yellow-orange in color. A second eyewear device 1805 comprises a pair of lenses 1806 having the transmission spectrum shown at the curve 1804. The lenses have a VLT of 36 percent and are considered a category 2 lens. A third eyewear device 1808 comprises a pair of lenses 1809 having the transmission spectrum shown at the curve 1807. The lenses have a VLT of 12 percent and are considered a category 3 lens. A fourth eyewear device 1811 comprises a pair of lenses 1812 having the transmission spectrum shown at the curve 1810. The lenses have a VLT of 3 percent and are considered a category 4 lens. The eyewear devices as shown are "fit-over" style glasses that can be worn over regular prescription glasses. Fit-over type glasses may feature "side shields" such as indicated at 1813 which are small lenses designed to provide adequate peripheral vision in combination with comprehensive coverage. The side shield lenses do not necessarily need to have the same transmission spectrum as the front lenses (e.g. 1803, 1806, 1809, 1812). Preferably the side shield lenses have the same or a similar color as the front lenses.

A method of using the foregoing collection of eyewear to fit and dispense and/or prescribe an appropriate eyewear device comprises first selecting a lighting condition for the trial, which may be an indoor condition with typical residential or commercial illumination, or an outdoor condition with typical daylight conditions, and then performing a sequence of trials consisting of: if the lighting condition is indoors, then adjusting the lighting and/or location of the trials so that the average surface illumination is between 0.0001 and 1000 lux, and then a) first positioning the highest transmission lens (Category 0, FIG. 18 at 1801) in front of the person's eyes so that a substantial portion of their field of view is transformed by the filter, and then allowing a period of time to elapse sufficient for the person to form a judgement regarding the effectiveness of the eyewear upon their functional vision, and then removing the eyewear and b) positioning the next lower transmission lens (Category 1, FIG. 18 at 1804) in front of the eyes of the person so that a substantial portion of their field of view is transformed by the filter, and then allowing and then allowing a period of time to elapse sufficient for the person to form a judgement regarding the effectiveness of the eyewear upon their functional vision, and then returning to step (a) and again to step (b), etc., until a final judgement regarding which lens is superior is formed by the person, and then fitting or dispensing or prescribing an eyewear device having a lens characterized by the spectral properties of the selected device; and, if the lighting condition is outdoors then adjusting the lighting and/or location of the trials so that the average surface illumination is greater than 1001 lux, and then a) first positioning the highest transmission lens (Category 2, FIG. 18 at 1804) in front of the person's eyes so that a substantial portion of their field of view is transformed by the filter, and then allowing a period of time to elapse sufficient for the person to form a judgement regarding the effectiveness of the eyewear upon their functional vision, and then removing the eyewear and b) positioning the next lower transmission lens (Category 3, FIG. 18 at 1807) in front of the eyes of the person so that a substantial portion of their field of view is transformed by the filter, and then allowing and then allowing a period of time to elapse sufficient for the person to form a judgement regarding the effectiveness of the eyewear upon their functional vision, and then optionally c) positioning the next lower transmission lens (Category 4, FIG. 18 at 1810) in front of the eyes of the person so that a substantial portion of their field of view is transformed by the filter, and then allowing and then allowing a period of time to elapse sufficient for the person to form a judgement regarding the effectiveness of the eyewear upon their functional vision, and then returning to any of step (a) or to step (b) or step (c), etc, until a final judgement regarding which lens is superior is formed by the person, and then fitting or dispensing or prescribing an eyewear device having a lens characterized by the spectral properties of the selected device. More preferably the device is provided in the form of a "fit-over" spectacle substantially as depicted in FIG. 18 at 1802.

Various embodiments are described in the following clauses.

Clause 1. An ophthalmic lens characterized by: a luminous transmittance between 60 percent and 85 percent; a maximum spectral transmittance between 460 nanometers and 510 nanometers less than 50 percent of the luminous transmittance; a minimum spectral transmittance between 550 nanometers and 700 nanometers greater than 60 percent; and a mean transmittance between 400 nanometers and 450 nanometers at least 4 times greater than a mean transmittance between 460 nanometers and 500 nanometers; wherein the luminous transmittance of the lens is defined as the weighted photopic transmittance of CIE Standard Illuminant D65 according to the CIE 1931 2-degree Standard Observer and the luminous transmittance of the lens and the spectral transmittance of the lens are measured at an optical center of the lens over a region equivalent to a 10 degree field of view when the lens is positioned in front of the eye of a person in a typical position of wear.

Clause 2. The ophthalmic lens of clause 1 wherein a minimum spectral transmittance of the lens between 460 nanometers and 500 nanometers is less than or equal to 1 percent.

Clause 3. The ophthalmic lens of clause 1 wherein the luminous transmittance of the lens is 80 percent plus or minus 3 percent.

Clause 4. The ophthalmic lens of clause 1 wherein the luminous transmittance of the lens is 75 percent plus or minus 3 percent.

Clause 5. The ophthalmic lens of any of clauses 1 through 4 wherein the lens has spatially varying spectral transmittance such that in a non-central region outside of the optical center of the lens the luminous transmittance of the lens is between 40 percent and 60 percent and in the non-central region the spectral transmittance has the following properties: the maximum spectral transmittance of the lens between 460 nanometers and 510 nanometers is less than 50 percent of the luminous transmittance of the filter; the minimum spectral transmittance of the lens between 550 nanometers and 700 nanometers is greater than 60 percent; and the mean transmittance of the filter between 400 nanometers and 450 nanometers is at least 4 times greater than the mean transmittance of the filter between 460 nanometers and 500 nanometers.

Clause 6. The ophthalmic lens of clause 5 wherein the non-central region is in an upper portion of the lens with respect to a position and orientation of the lens within a device that positions the lens in front of the eye with a fixed orientation.

Clause 7. A method comprising: positioning an eyewear device comprising the ophthalmic lens of any of clauses 1-6 over the eyes of a person so that the person's field of view is substantially filtered by the spectral transmission of the ophthalmic lens.

Clause 8. The method of clause 7 wherein: the eyewear device provides relief from the discomfort of glare; and glare is a visual condition caused by a significant ratio of luminance between the average surface illumination and the glare source where the glare source is a region within the visual field having a luminance that is significantly higher than the average surface illumination and the glare source causes an instinctive desire to look away from the region of higher luminance due to an elevated sensitivity to bright light and/or excessive luminance of the glare source.

Clause 9. A method comprising: positioning an eyewear device comprising the ophthalmic lens of any of clauses 1-6 over the eyes of a person so that the person's field of view is substantially filtered by the spectral transmission of the ophthalmic lens; the person then viewing through the ophthalmic lens traffic lights or marine navigation lights or aircraft navigation lights from a distance of greater than 10 feet and under outdoor conditions with low ambient light including dawn, dusk or night time; and the person then making judgements of the apparent color of said lights while operating a vehicle, marine craft or aircraft as seen through the lens.

Clause 10. The method of clause 9 wherein the person suffers from color vision deficiency.

Clause 11. The method of clause 10 wherein the person has deuteranomalous color vision deficiency or the person has protanomalous color vision deficiency.

Clause 12. A method comprising: after the start of dusk or night time, positioning an eyewear device comprising the ophthalmic lens of any of clauses 1-6 over the eyes of a person so that the person's field of view is substantially filtered by the spectral transmission of the ophthalmic lens; and the person then wearing the eyewear device continuously for at least 2 hours or until the person goes to sleep.

Clause 13. The method of clause 12 further comprising the person using a computer, mobile phone or tablet or watching television while wearing the eyewear device.

Clause 14. An ophthalmic lens characterized by: a luminous transmittance between 1 percent and 40 percent; a mean spectral transmittance between 460 nanometers and 500 nanometers less than or equal to 1 percent; a mean transmittance between 520 nanometers and 550 nanometers greater than the luminous transmittance, a mean transmittance between 600 nanometers and 650 nanometers greater than 10%; a mean transmittance between 400 nanometers and 450 nanometers at least 4 times greater than the mean transmittance of the filter between 460 nanometers and 500 nanometers; and a mean transmittance between 560 nanometers and 590 nanometers at least two times greater than the mean spectral transmittance between 460 nanometers and 500 nanometers; wherein the luminous transmittance of the lens and the spectral transmittance of the lens are measured at an optical center of the lens over a region equivalent to a 10 degree field of view when the lens is positioned in front of an eye of a person in the typical position of wear, and the luminous transmittance of the lens is defined as the weighted photopic transmittance of CIE Standard Illuminant D65 according to the CIE 1931 2-degree Standard Observer.

Clause 15. The ophthalmic lens of clause 14 wherein the luminous transmittance is between 20 percent and 40 percent.

Clause 16. The ophthalmic lens of clause 14 wherein the luminous transmittance is between 8 percent and 18 percent.

Clause 17. The ophthalmic lens of clause 14 wherein the luminous transmittance is less than 8 percent.

Clause 18. The ophthalmic lens of clause 14 wherein the luminous transmittance is less than 4 percent.

Clause 19. A method of slowing the progression of a cone dystrophy disease in a person diagnosed with the cone dystrophy disease, the method comprising: a) positioning an eyewear device comprising the ophthalmic lens of any of clauses 1-6 over the eyes of the person so that the person's field of view is substantially filtered by the spectral transmission of the ophthalmic lens; b) maintaining the eyewear device in position for a substantial portion of the person's daily waking hours; and c) repeating steps a) and b) on a substantially daily basis over a period of at least one year.

Clause 20. The method of clause 19 wherein the progressive cone dystrophy disease is retinitis pigmentosa.

Clause 21. A method of slowing the progression of a cone dystrophy disease in a person diagnosed with the cone dystrophy disease, the method comprising: a) if the person is in an environment having lighting conditions of typical indoor residential or commercial lighting, positioning an eyewear device comprising the ophthalmic lens of any of clauses 1-6 over the eyes of the person so that the person's field of view is substantially filtered by the spectral transmission of the ophthalmic lens; or b) if the person is in an environment having lighting conditions of typical outdoor daylight, positioning an eyewear device comprising an ophthalmic lens of any of clauses 14-18 over the eyes of the person so that the person's field of view is substantially filtered by the spectral transmission of the ophthalmic lens; c) repeating steps a) and b) if the lighting conditions of the person's environment change; d) maintaining an eyewear device according to step a) or step b) in position for a substantial portion of the person's daily waking hours; and e) repeating steps a) through d) on a substantially daily basis during waking hours over a period of at least one year.

Clause 22. The method of clause 21 wherein the progressive cone dystrophy disease is retinitis pigmentosa.

Clause 23. A method of providing relief from the glare of bright light to a person recovering from cataract surgery in an eye, the method comprising: positioning an eyewear device comprising an ophthalmic lens of any of clauses 14-18 with the ophthalmic lens over an over the eye; and the person then wearing the eyewear device during waking hours for a period of at least one week.

Clause 24. A method of improving the vision of a person comprising: a) if the person is in an environment having lighting conditions of typical indoor residential or commercial lighting, positioning an eyewear device comprising the ophthalmic lens of any of clauses 1-6 or clause 15 over the eyes of the person so that the person's field of view is substantially filtered by the spectral transmission of the ophthalmic lens; b) if the person is in an environment having lighting conditions of typical outdoor daylight, positioning an eyewear device comprising an ophthalmic lens of clauses 16 over the eyes of the person so that the person's field of view is substantially filtered by the spectral transmission of the ophthalmic lens.

Clause 25. The method of clause 24 wherein the person suffers from elevated sensitivity to bright light or from photophobia.

Clause 26. The method of clause 24 wherein the person suffers from low vision.

Clause 27. The method of clause 24 wherein the person suffers from age-related color vision deficiency.

Clause 28. A method of prescribing an ophthalmic lens comprising a blue-light attenuating filter to a person, the method comprising: selecting a desired lighting condition for use of the blue-light attenuating filter having an average surface illumination, if the average surface illumination is between 0.0001 and 1000 lux, then adjusting the lighting conditions so that an average surface illumination between 0.0001 and 1000 is provided, a) then positioning a first eyewear device in front of the eyes of the person so that a substantial portion of the person's field of view is filtered by the a first trial lens, the trial lens characterized by any of the clauses 1 through 6, and then allowing a sufficient amount of time to elapse for the person to form a judgement regarding the effectiveness of the first trial lens upon their vision, and then removing the first eyewear device and b) positioning a second eyewear device in front of the eyes of the person so that a substantial portion of the person's field of view is filtered by a second trial lens, and the second trial lens characterized by any of the clauses 14 through 18, and then allowing a sufficient amount of time to elapse for the person to form a judgement regarding the effectiveness of the second trial lens upon their vision, and then returning to step (a) and continuing to step (b) until a final judgement is reached regarding which of the two trial eyewear devices provides the most preferable effect upon the vision of the person, and then recommending or prescribing or dispensing an eyewear device to the person wherein the eyewear device has an ophthalmic lens characterized by the properties of the lens of the most preferred device according to the method.

Clause 29. A method of prescribing an ophthalmic lens comprising a blue-light attenuating filter to a person, the method comprising: selecting a desired lighting condition for use of the blue-light attenuating filter having an average surface illumination, if the desired lighting condition has an average surface illumination between 0.0001 and 1000 lux, then adjusting the lighting conditions so that an average surface illumination between 0.0001 and 1000 is provided, a) then positioning a first eyewear device in front of the eyes of the person so that a substantial portion of the person's field of view is filtered by the a first trial lens, the first trial lens characterized by any of the clauses 14 through 18 and wherein the luminous transmittance of the first trial lens is between 20 percent to 40 percent, and then allowing a sufficient amount of time to elapse for the person to form a judgement regarding the effectiveness of the first trial lens upon their vision, and then removing the first eyewear device and b) positioning a second eyewear device in front of the eyes of the person so that a substantial portion of the person's field of view is filtered by a second trial lens, and the second trial lens characterized by any of the clauses 14 through 18 and the luminous transmittance of the lens is between 8 percent and 19 percent, and then allowing a sufficient amount of time to elapse for the person to form a judgement regarding the effectiveness of the second trial lens upon their vision, and then optionally, either removing the first eyewear device and c) positioning a second eyewear device in front of the eyes of the person so that a substantial portion of the person's field of view is filtered by a second trial lens, and the second trial lens characterized by any of the clauses 14 through 18 and the luminous transmittance of the lens is between 1 percent and 7 percent and then allowing a sufficient amount of time to elapse for the person to form a judgement regarding the effectiveness of the second trial lens upon their vision, and then returning to step (a) or to returning step (b) and continuing (optionally) to step (c) until a final judgement is reached regarding which of the two (or three) trial eyewear devices provides the most preferable effect upon the vision of the person, and then recommending or prescribing or dispensing an eyewear device to the person wherein the eyewear device has an ophthalmic lens characterized by the properties of the lens of the most preferred device according to the method.

Clause 30. A method comprising: selecting according to the following criteria an eyewear device comprising an ophthalmic lens for viewing a visual scene having an average surface illumination: if the average surface illumination is between 0.0001 and 100 lux, the luminous transmittance of the lens is between 60% and 85%, the maximum transmittance of the lens between 460 nanometers to 510 nanometers is less than 50 percent of the luminous transmittance of the filter, the minimum transmittance of the lens between 550 nanometers and 700 nanometers is greater than 60 percent, and the mean transmittance of the filter between 400 nanometers and 450 nanometers is at least 4 times greater than the mean transmittance of the filter between 460 nanometers and 500 nanometers; if the average surface illumination is between 101 and 1000 lux, the luminous transmittance of the lens is between 8% and 40%, the transmittance of the lens between 460 nanometers to 510 nanometers is less than 5 percent, the transmittance of the lens between 520 nanometers and 540 nanometers is greater than the luminous transmittance of the lens, the transmittance of the lens between 600 nanometers and 700 nanometers is greater than the luminous transmittance of the lens, and the mean transmittance of the filter between 400 nanometers and 450 nanometers is at least 4 times greater than the mean transmittance of the filter between 460 nanometers and 510 nanometers; if the average surface illuminance is greater than 1001 lux, the luminous transmittance of the lens is between 1% and 7%, the transmittance of the lens between 460 nanometers to 510 nanometers is less than 1 percent, the transmittance of the lens between 520 nanometers and 550 nanometers is greater than the luminous transmittance of the lens, the transmittance of the lens between 600 nanometers and 650 nanometers is greater than 10%, and the mean transmittance of the filter between 400 nanometers and 450 nanometers is at least 5 times greater than the mean transmittance of the filter between 460 nanometers and 510 nanometers; wherein: the luminous transmittance of the lens, the spectral transmittance of the lens and the mean transmittance of the lens are defined according to measurement methods for characterizing the spectral properties of spectacle lenses as defined by American National Standards Institute Z80.3-2015; the luminous transmittance of the optical filter is defined as the weighted photopic transmittance of CIE Standard Illuminant D65 according to the CIE 1931 2-degree Standard Observer, the minimum spectral transmittance over a range of wavelengths is the lowest spectral transmittance within the range of wavelengths; the maximum spectral transmittance over a range of wavelengths is the highest spectral transmittance within the range of wavelengths; and the mean spectral transmittance over a range of wavelengths is the average spectral transmittance over the range of wavelengths.

Clause 31. The method of clause 30, wherein the average surface illumination is between 0.0001 and 100 lux, the luminous transmittance of the lens is between 60% and 85%, the maximum transmittance of the lens between 460 nanometers to 510 nanometers is less than 50 percent of the luminous transmittance of the filter, the minimum transmittance of the lens between 550 nanometers and 700 nanometers is greater than 60 percent, and the mean transmittance of the filter between 400 nanometers and 450 nanometers is at least 4 times greater than the mean transmittance of the filter between 460 nanometers and 500 nanometers.

Clause 32. The method of clause 30, wherein the average surface illumination is between 101 and 1000 lux, the luminous transmittance of the lens is between 8% and 40%, the transmittance of the lens between 460 nanometers to 510 nanometers is less than 5 percent, the transmittance of the lens between 520 nanometers and 540 nanometers is greater than the luminous transmittance of the lens, the transmittance of the lens between 600 nanometers and 700 nanometers is greater than the luminous transmittance of the lens, and the mean transmittance of the filter between 400 nanometers and 450 nanometers is at least 4 times greater than the mean transmittance of the filter between 460 nanometers and 500 nanometers.

Clause 33. The method of clause 30, the average surface illuminance is greater than 1001 lux, the luminous transmittance of the lens is between 1% and 7%, the transmittance of the lens between 460 nanometers to 510 nanometers is less than 1 percent, the transmittance of the lens between 520 nanometers and 550 nanometers is greater than the luminous transmittance of the lens, the transmittance of the lens between 600 nanometers and 650 nanometers is greater than 10%, and the mean transmittance of the filter between 400 nanometers and 450 nanometers is at least 4 times greater than the mean transmittance of the filter between 460 nanometers and 500 nanometers.

Clause 34. The method of any of clauses 30-33, comprising positioning the eyewear device over the eyes of a person so that the person's field of view is substantially filtered by the spectral transmission of the ophthalmic lens.

Clause 35. The method of any of clauses 30-33, wherein: the eyewear device improves vision for a person with low vision; and low vision is a condition caused by eye disease in which visual acuity is 20/70 or poorer in the better-seeing eye and cannot be corrected or improved refractively.

Clause 36. The method of any of clauses 30-33, wherein: the eyewear device provides relief from the discomfort of glare; and glare is a visual condition caused by a significant ratio of luminance between the average surface illumination and the glare source where the glare source is a region within the visual field having a luminance that is significantly higher than the average surface illumination and the glare source causes an instinctive desire to look away from the region of higher luminance due to an elevated sensitivity to bright light and/or excessive luminance of the glare source.

Clause 37. The method of any of clauses 30-33, wherein the eyewear device reduces the frequency or intensity of epileptic seizures caused by visual stimuli.

The invention claimed is:

1. An ophthalmic lens having a luminous transmittance between 60 percent and 85 percent, where the luminous transmittance is the weighted photopic transmittance of CIE Standard Illuminant D65 according to the CIE 1931 2-degree Standard Observer, the ophthalmic lens having a spectral transmittance curve comprising:
   a maximum spectral transmittance between 460 nanometers and 510 nanometers less than 50 percent of the luminous transmittance;
   a minimum spectral transmittance between 460 nanometers and 500 nanometers less than or equal to 1 percent;
   a minimum spectral transmittance between 550 nanometers and 700 nanometers greater than 60 percent; and
   a mean transmittance between 400 nanometers and 450 nanometers at least 4 times greater than a mean transmittance between 460 nanometers and 500 nanometers.

2. The ophthalmic lens of claim 1 wherein the maximum spectral transmittance between 460 nanometers and 510 nanometers less than 20 percent of the luminous transmittance.

3. The ophthalmic lens of claim 1 wherein the maximum spectral transmittance between 460 nanometers and 510 nanometers less than 10 percent of the luminous transmittance.

4. The ophthalmic lens of claim 1 wherein the luminous transmittance of the lens is 80 percent plus or minus 3 percent.

5. The ophthalmic lens of claim 1 wherein the luminous transmittance of the lens is 75 percent plus or minus 3 percent.

6. The ophthalmic lens of claim 1 wherein the lens has spatially varying spectral transmittance such that in a non-central region outside of the optical center of the lens the luminous transmittance of the lens is between 40 percent and 60 percent and in the non-central region the spectral transmittance has the following properties:
   the maximum spectral transmittance between 460 nanometers and 510 nanometers is less than 50 percent of the luminous transmittance;
   the minimum spectral transmittance between 550 nanometers and 700 nanometers is greater than 60 percent; and
   the mean transmittance between 400 nanometers and 450 nanometers is at least 4 times greater than the mean transmittance between 460 nanometers and 500 nanometers.

7. The ophthalmic lens of claim 6 wherein the non-central region is in an upper portion of the lens with respect to a position and orientation of the lens within a device that positions the lens in front of the eye with a fixed orientation.

8. A method comprising:
   positioning an eyewear device comprising the ophthalmic lens of claim 1 over the eyes of a person so that the person's field of view is substantially filtered by the spectral transmission of the ophthalmic lens.

9. The method of claim 8 wherein:
   the eyewear device provides relief from the discomfort of glare; and
   glare is a visual condition caused by a significant ratio of luminance between the average surface illumination and the glare source where the glare source is a region within the visual field having a luminance that is significantly higher than the average surface illumination and the glare source causes an instinctive desire to look away from the region of higher luminance due to an elevated sensitivity to bright light and/or excessive luminance of the glare source.

10. A method comprising:
    positioning an eyewear device comprising the ophthalmic lens of claim 1 over the eyes of a person so that the person's field of view is substantially filtered by the spectral transmission of the ophthalmic lens;
    the person then viewing through the ophthalmic lens traffic lights or marine navigation lights or aircraft navigation lights from a distance of greater than 10 feet and under outdoor conditions with low ambient light including dawn, dusk or night time; and
    the person then making judgements of the apparent color of said lights while operating a vehicle, marine craft or aircraft as seen through the lens.

11. The method of claim 10 wherein the person suffers from color vision deficiency.

12. The method of claim 11 wherein the person has deuteranomalous color vision deficiency or the person has protanomalous color vision deficiency.

13. A method comprising:
    after the start of dusk or night time, positioning an eyewear device comprising the ophthalmic lens of claim 1 over the eyes of a person so that the person's field of view is substantially filtered by the spectral transmission of the ophthalmic lens; and
    the person then wearing the eyewear device continuously for at least 2 hours or until the person goes to sleep.

14. The method of claim 13 further comprising the person using a computer, mobile phone or tablet or watching television while wearing the eyewear device.

15. An ophthalmic lens having a luminous transmittance between 1 percent and 40 percent, where the luminous transmittance is the weighted photopic transmittance of CIE Standard Illuminant D65 according to the CIE 1931 2-degree Standard Observer, the ophthalmic lens having a spectral transmittance curve comprising:
    a mean spectral transmittance between 460 nanometers and 500 nanometers less than or equal to 1 percent;
    a mean transmittance between 520 nanometers and 550 nanometers greater than the luminous transmittance,
    a mean transmittance between 600 nanometers and 650 nanometers greater than 10%;
    a mean transmittance between 400 nanometers and 450 nanometers at least 4 times greater than the mean transmittance between 460 nanometers and 500 nanometers; and
    a mean transmittance between 560 nanometers and 590 nanometers at least two times greater than the mean spectral transmittance between 460 nanometers and 500 nanometers.

16. The ophthalmic lens of claim 15 wherein the luminous transmittance is between 20 percent and 40 percent.

17. The ophthalmic lens of claim 15 wherein the luminous transmittance is between 8 percent and 18 percent.

18. The ophthalmic lens of claim 15 wherein the luminous transmittance is less than 8 percent.

19. The ophthalmic lens of claim 15 wherein the luminous transmittance is less than 4 percent.

20. An ophthalmic lens having a luminous transmittance between 8 percent and 40 percent, where the luminous transmittance is the weighted photopic transmittance of CIE Standard Illuminant D65 according to the CIE 1931 2-degree Standard Observer, the ophthalmic lens having a spectral transmittance curve comprising:
    a mean spectral transmittance between 460 nanometers and 510 nanometers less than percent;
    a mean transmittance between 520 nanometers and 540 nanometers greater than the luminous transmittance,
    a mean transmittance between 600 nanometers and 700 nanometers greater than the luminous transmittance; and
    a mean transmittance between 400 nanometers and 450 nanometers at least 4 times greater than the mean transmittance between 460 nanometers and 510 nanometers.

* * * * *